(12) United States Patent
Flitsch et al.

(10) Patent No.: US 9,941,547 B2
(45) Date of Patent: Apr. 10, 2018

(54) BIOMEDICAL ENERGIZATION ELEMENTS WITH POLYMER ELECTROLYTES AND CAVITY STRUCTURES

(71) Applicant: Johnson & Johnson Vision Care, Inc., Jacksonville, FL (US)

(72) Inventors: Frederick A. Flitsch, New Windsor, NY (US); Millburn Ebenezer Jacob Muthu, Jacksonville, FL (US); Daniel B. Otts, Fruit Cove, FL (US); Randall B. Pugh, St. Johns, FL (US); James Daniel Riall, St. Johns, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 2 days.

(21) Appl. No.: 14/949,963

(22) Filed: Nov. 24, 2015

(65) Prior Publication Data

US 2016/0079631 A1 Mar. 17, 2016

Related U.S. Application Data

(63) Continuation-in-part of application No. 14/827,589, filed on Aug. 17, 2015.
(Continued)

(51) Int. Cl.
| | |
|---|---|
| H01M 4/24 | (2006.01) |
| H01M 10/26 | (2006.01) |
| H01M 4/38 | (2006.01) |
| B29D 11/00 | (2006.01) |
| H01M 2/02 | (2006.01) |

(Continued)

(52) U.S. Cl.
CPC ....... *H01M 10/26* (2013.01); *B29D 11/00817* (2013.01); *H01M 2/0202* (2013.01); *H01M 4/06* (2013.01); *H01M 4/38* (2013.01); *H01M 4/502* (2013.01); *H01M 6/181* (2013.01); *G02C 7/04* (2013.01); *H01M 10/0436* (2013.01); *H01M 2002/0205* (2013.01); *H01M 2220/30* (2013.01); *H01M 2300/0014* (2013.01); *H01M 2300/0082* (2013.01)

(58) Field of Classification Search
CPC ....................................................... H01M 4/00
See application file for complete search history.

(56) References Cited

U.S. PATENT DOCUMENTS

| | | |
|---|---|---|
| 3,642,539 A | 2/1972 | Kawakami |
| 4,125,686 A | 11/1978 | Kinsman |

(Continued)

FOREIGN PATENT DOCUMENTS

| | | |
|---|---|---|
| CA | 2389907 A1 | 12/2003 |
| CN | 102959769 A | 3/2013 |

(Continued)

OTHER PUBLICATIONS

Geduld, Herb, "Zinc Plating", XP055290076, Columbia Chemical Corp., Macedonia, OH Jan. 1, 1988.
(Continued)

*Primary Examiner* — Jacob Marks
(74) *Attorney, Agent, or Firm* — Carl J. Evens

(57) ABSTRACT

Designs, strategies and methods to form energization elements comprising polymer electrolytes are described. In some examples, the biocompatible energization elements may be used in a biomedical device. In some further examples, the biocompatible energization elements may be used in a contact lens.

10 Claims, 11 Drawing Sheets

Related U.S. Application Data

(60) Provisional application No. 62/040,178, filed on Aug. 21, 2014.

(51) Int. Cl.
*H01M 4/06* (2006.01)
*H01M 4/50* (2010.01)
*H01M 6/18* (2006.01)
*G02C 7/04* (2006.01)
*H01M 10/04* (2006.01)

(56) References Cited

U.S. PATENT DOCUMENTS

| | | |
|---|---|---|
| 4,977,046 A | 12/1990 | Bleszinski, Jr. |
| 5,358,539 A | 10/1994 | Dawson |
| 5,540,741 A | 7/1996 | Gozdz et al. |
| 5,607,485 A | 3/1997 | Gozdz et al. |
| 5,712,721 A | 1/1998 | Large |
| 6,273,904 B1 | 8/2001 | Chen |
| 6,277,520 B1 | 8/2001 | Moutsios |
| 6,316,142 B1 | 11/2001 | Delnick |
| 6,379,835 B1 | 4/2002 | Kucherovsky |
| 7,985,500 B2 | 7/2011 | Root |
| 9,601,780 B2 | 3/2017 | Kato |
| 2002/0110728 A1 | 8/2002 | Gozdz et al. |
| 2003/0146414 A1 | 8/2003 | Ndzebet |
| 2003/0165744 A1 | 9/2003 | Schubert |
| 2003/0207978 A1 | 11/2003 | Yadav |
| 2004/0062985 A1 | 4/2004 | Aamodt |
| 2004/0091779 A1 | 5/2004 | Kang |
| 2004/0258982 A1 | 12/2004 | Coffey |
| 2005/0208381 A1 | 9/2005 | Boulton |
| 2006/0099496 A1 | 5/2006 | Aamodt |
| 2007/0125644 A1 | 6/2007 | Heller |
| 2007/0141463 A1 | 6/2007 | Stevanovic |
| 2007/0156184 A1 | 7/2007 | Root |
| 2009/0092903 A1 | 4/2009 | Johnson |
| 2009/0098281 A1 | 4/2009 | Zhang |
| 2010/0072643 A1 | 3/2010 | Pugh |
| 2010/0078837 A1 | 4/2010 | Pugh |
| 2010/0266895 A1 | 10/2010 | Tucholski |
| 2011/0091778 A1 | 4/2011 | Kambara |
| 2012/0088129 A1 | 4/2012 | Kaneda |
| 2012/0107666 A1 | 5/2012 | Bailey |
| 2012/0115041 A1 | 5/2012 | West |
| 2012/0162600 A1 | 6/2012 | Pugh |
| 2013/0089769 A1 | 4/2013 | Proctor |
| 2013/0155371 A1 | 6/2013 | Zhang |
| 2013/0196214 A1 | 8/2013 | Scott |
| 2013/0309547 A1 | 11/2013 | Bazzarella |
| 2014/0000101 A1 | 1/2014 | Pugh |
| 2014/0002788 A1 | 1/2014 | Otts |
| 2014/0121557 A1 | 5/2014 | Gannon |
| 2014/0147742 A1 | 5/2014 | Anastas |
| 2015/0214567 A1 | 7/2015 | Etzkorn |
| 2015/0287960 A1 | 10/2015 | Andry |
| 2015/0323811 A1 | 11/2015 | Flitsch |

FOREIGN PATENT DOCUMENTS

| | | |
|---|---|---|
| EP | 918248 A2 | 5/1999 |
| EP | 1183745 A1 | 3/2002 |
| EP | 1313159 A2 | 5/2003 |
| EP | 1892788 A1 | 2/2008 |
| EP | 2564454 A1 | 3/2013 |
| EP | 2779272 A1 | 9/2014 |
| GB | 1307393 A | 2/1973 |
| IL | 222620 | 12/2012 |
| RU | 2563842 C2 | 9/2015 |
| SG | 10201506558 A1 | 3/2016 |
| WO | WO1997017737 A1 | 5/1997 |
| WO | WO2000004601 A1 | 1/2000 |
| WO | WO2000057504 A1 | 9/2000 |
| WO | WO2002029836 A1 | 4/2002 |
| WO | WO2003069700 A2 | 8/2003 |
| WO | WO2003069700 A3 | 8/2004 |
| WO | WO2005064712 A1 | 7/2005 |
| WO | WO2007102692 A1 | 9/2007 |
| WO | WO2008039806 A2 | 4/2008 |
| WO | WO2008039806 A3 | 7/2008 |
| WO | WO2009012463 A2 | 1/2009 |
| WO | WO2009018315 A2 | 2/2009 |
| WO | WO2011015866 A1 | 2/2011 |
| WO | WO2011137239 A1 | 11/2011 |
| WO | WO2012046854 A1 | 4/2012 |
| WO | WO2013128206 A1 | 9/2013 |
| WO | WO2014071571 A1 | 5/2014 |

OTHER PUBLICATIONS

Fernando Yanez et al., "Macromolecule release and smoothness of semi-interpenetrating PVP-pHEMA networks for comfortable soft contact lenses", European Journal of Pharmaceutics, Elsevier Science Publishers B.V., Amsterdam, NL, vol. 69, No. 3, Aug. 1, 2008, pp. 1094-1103, XP023519572, ISSN: 0939-6411.

Elena A. Belyaeva et al., "Mechanism(s) of Toxic Action of Zn2+ and Selenite: A Study on AS-30D Hepatoma Cells and Isolated Mitochondria", Biochemistry Research International, vol. 42, No. 6, Jan. 1, 2011, pp. 361-13.

Albano et al., "Design of an Implantable power supply for an intraocular sensor, using Power (power optimization for wireless energy requirements)" Journal of Power Soureces, Elsevier SA, CH, vol. 170, No. 1, Apr. 11, 2007, pp. 216-224.

Stani A. et al., "Development of flat plate rechargeable alkaline manganese dioxide-zinc cells", Journal of Power Sources, Elsevier SA, vol. 153, No. 2, Jun. 28, 2005, pp. 405-412.

A. M. Gaikwad, B. V. Khau, G. Davies, B. Hertzberg, D. A. Steingart, and A. C. Arias, "A High Areal Capacity Flexible Lithium-Ion Battery with a Strain-Compliant Design," *Advanced Energy Materials*, vol. 55, iss. 3, 2015.

A. M. Gaikwad, A. C. Arias, and D. A. Steingart, "Recent Progress on Printed Flexible Batteris: Mechanical Challenges, Printing Technologies, and Future Prospects," *Energy Technology*, 2015.

A. E. Ostfeld, I. Deckman, A. M. Gaikwad, C. M. Lochner, and A. C. Arias, "Screen printed passive components for flexible power electronics," *Scientific reports*, vol. 5, 2015.

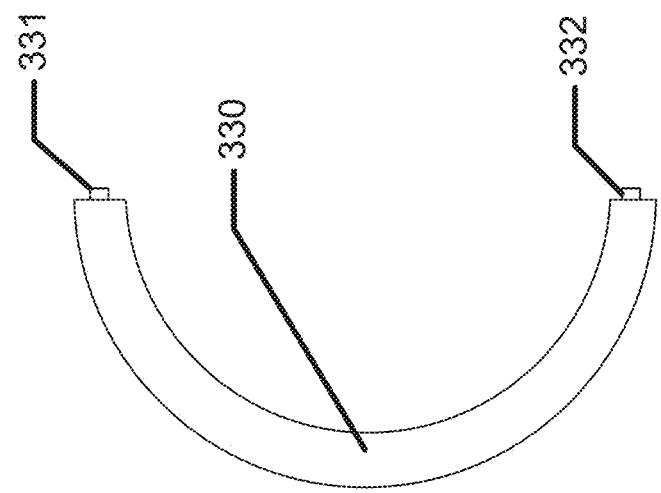
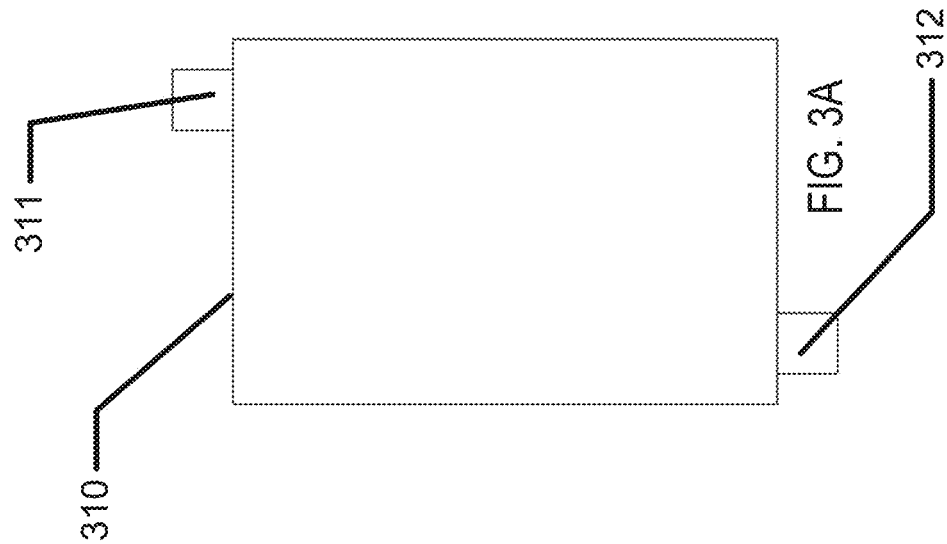

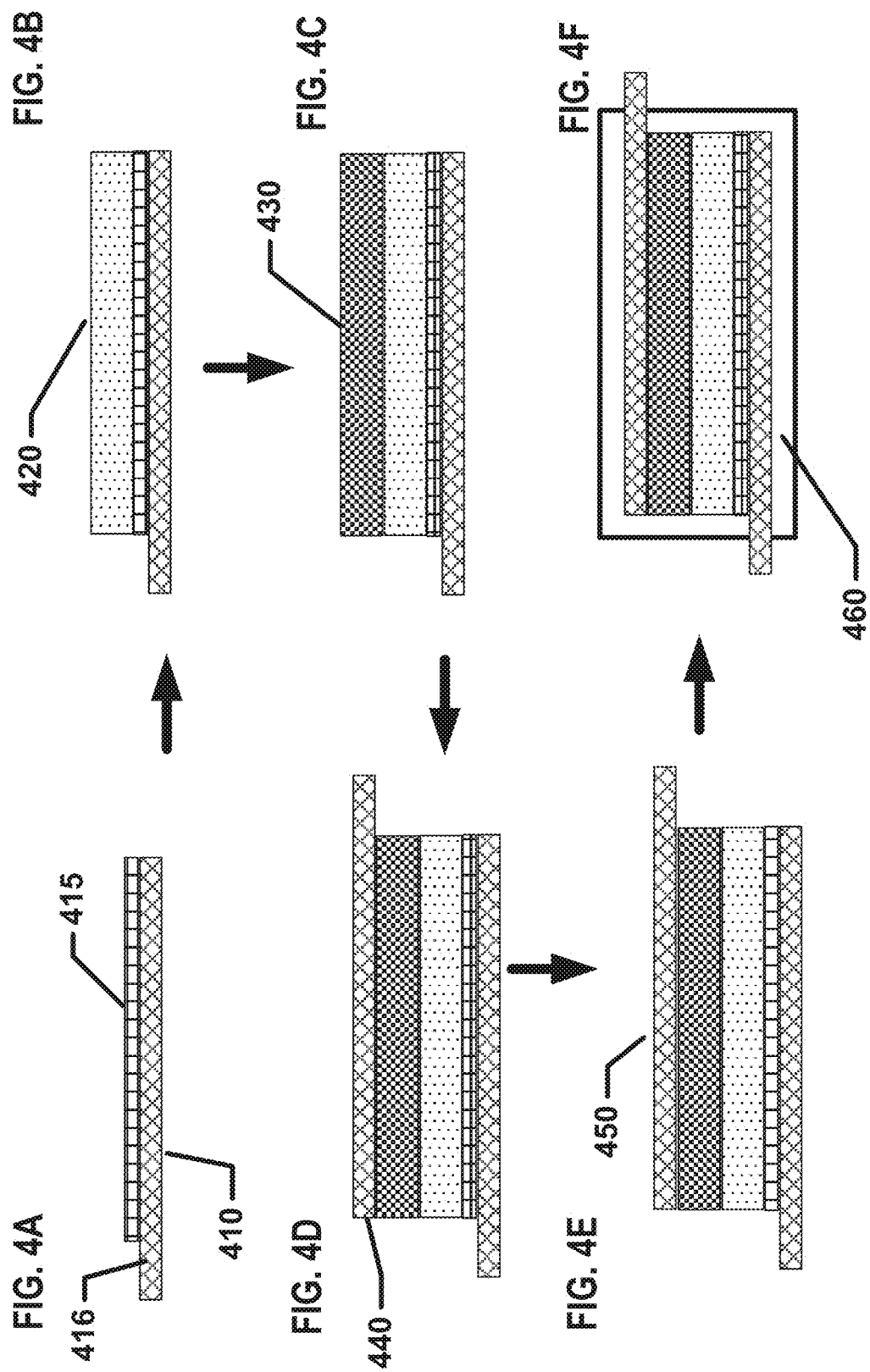

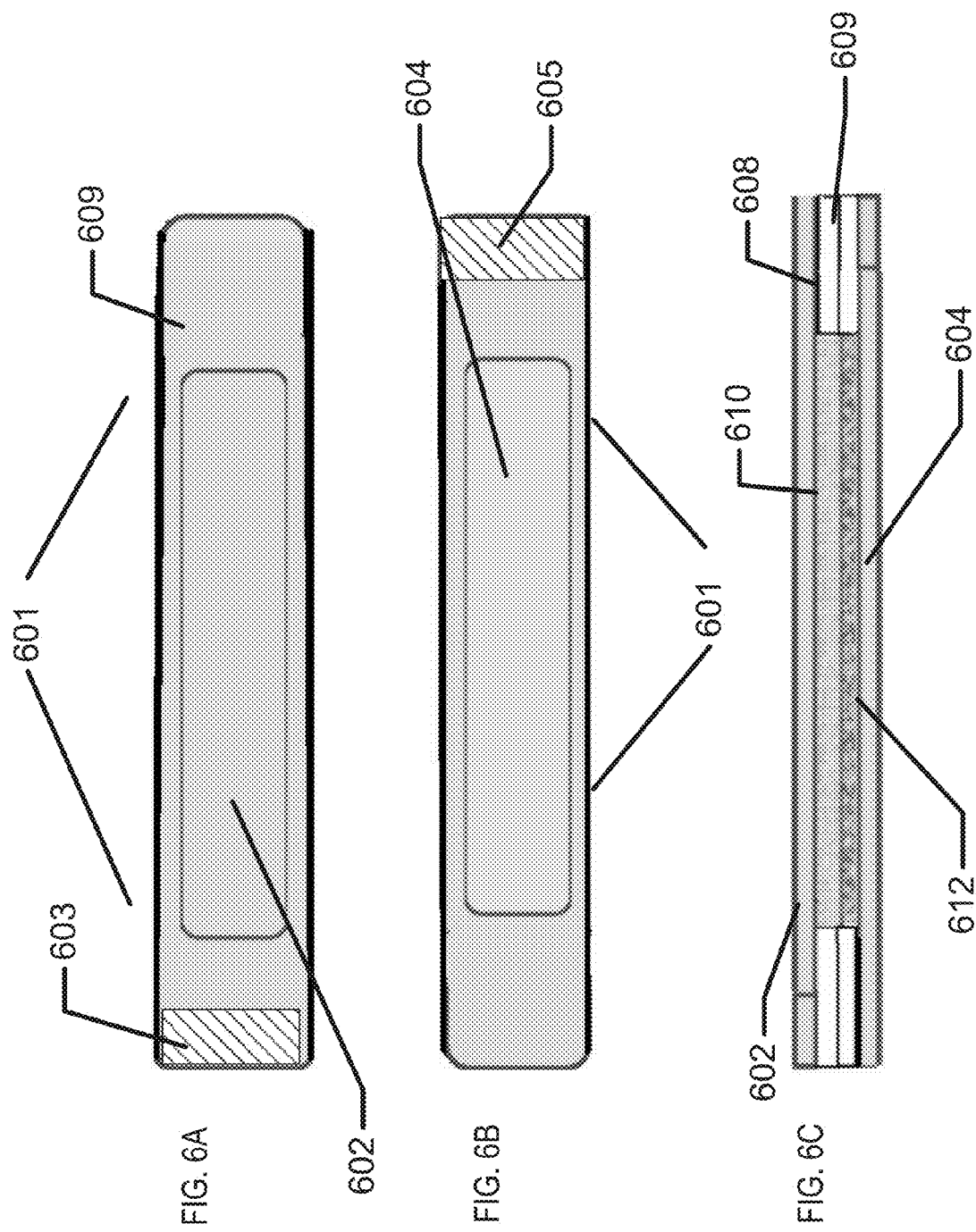

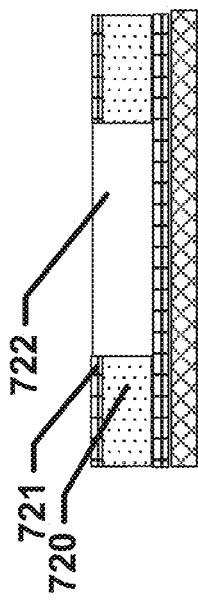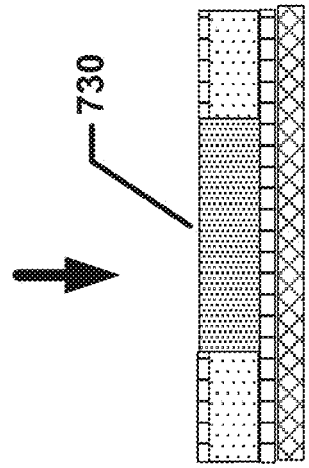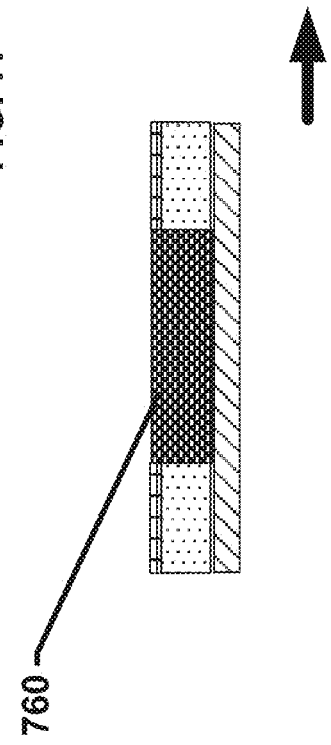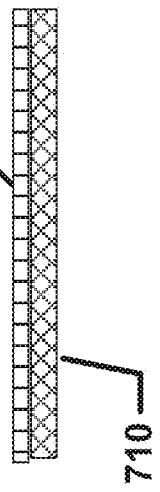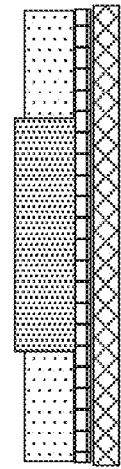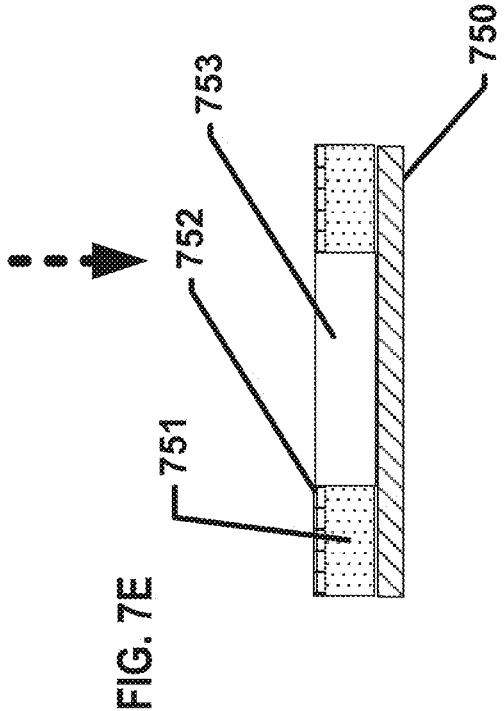

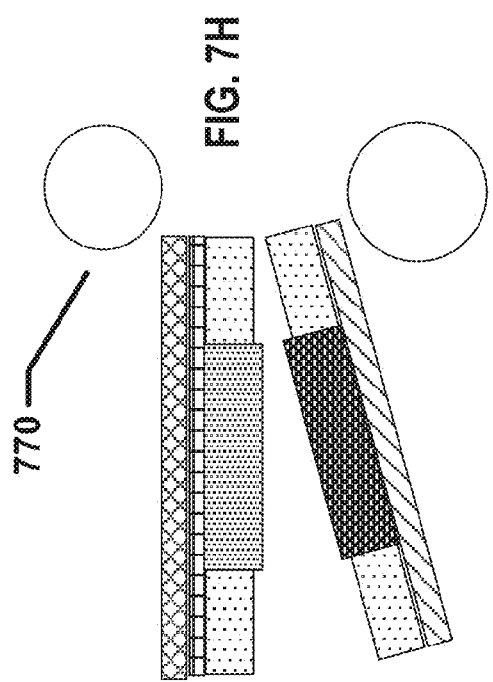
FIG. 7G
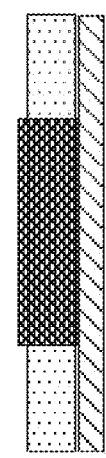
FIG. 7H
FIG. 7I
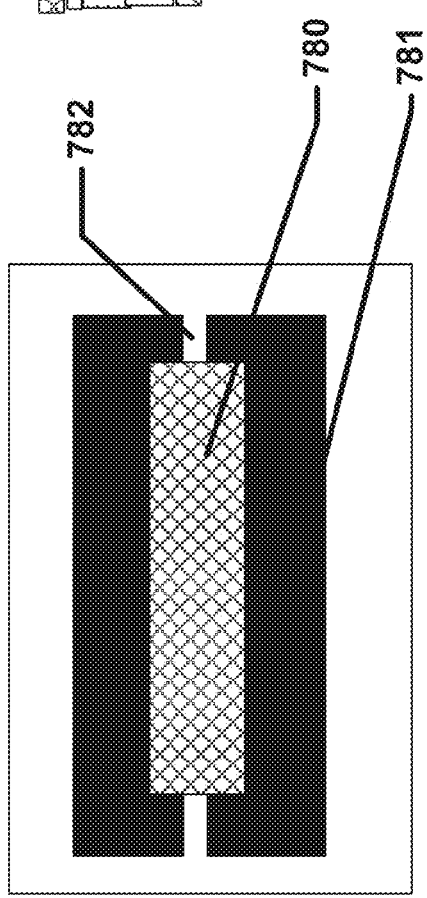
FIG. 7J

BIOMEDICAL ENERGIZATION ELEMENTS WITH POLYMER ELECTROLYTES AND CAVITY STRUCTURES

CROSS REFERENCE TO RELATED APPLICATIONS

This patent application is a continuation-in-part to U.S. patent application Ser. No. 14/827,589 filed Aug. 17, 2015 which claims the benefit of U.S. Provisional Application No. 62/040,178 filed Aug. 21, 2014.

BACKGROUND OF THE INVENTION

1. Field of the Invention

Designs and methods to improve performance and biocompatibility aspects of batteries are described. In some examples, electrolytes are provided in a polymer form and a laminate structure with cavities is used.

2. Description of the Related Art

Recently, the number of medical devices and their functionality has begun to rapidly develop. These medical devices may include, for example, implantable pacemakers, electronic pills for monitoring and/or testing a biological function, surgical devices with active components, contact lenses, infusion pumps, and neurostimulators. Added functionality and an increase in performance to many of the aforementioned medical devices have been theorized and developed. However, to achieve the theorized added functionality, many of these devices now require self-contained energization means that are compatible with the size and shape requirements of these devices, as well as the energy requirements of the new energized components.

Some medical devices may include electrical components such as semiconductor devices that perform a variety of functions and may be incorporated into many biocompatible and/or implantable devices. However, such semiconductor components require energy and thus, energization elements should preferably also be included in such biocompatible devices. The topology and relatively small size of the biocompatible devices may create challenging environments for the definition of various functionalities. In many examples, it may be important to provide safe, reliable, compact and cost-effective means to energize the semiconductor components within the biocompatible devices. Therefore, a need exists for biocompatible energization elements formed for implantation within or upon biocompatible devices where the structure of the millimeter- or smaller-sized energization elements provides enhanced function for the energization element while maintaining biocompatibility.

One such energization element used to power a device may be a battery. When using a battery in biomedical type applications, it may be important that the battery structure and design inherently provide resistance to incursions and excursions of materials. A polymer electrolyte battery design may afford such resistance. Therefore a need exists for novel examples of polymer electrolyte batteries that are biocompatible for use as biocompatible energization elements.

SUMMARY OF THE INVENTION

Accordingly, polymer battery designs and related strategies and designs for use in biocompatible energization elements have been disclosed.

One general aspect includes a biomedical device which includes an electroactive component and a battery. The battery may include a polymer electrolyte, where the polymer electrolyte includes an ionic species. The battery also includes a manganese dioxide cathode. The battery also includes a first laminate layer including a first cavity, where the first cavity contains an amount of the polymer electrolyte. The battery also includes a second laminate layer including a second cavity where the second cavity contains an amount of the manganese dioxide cathode. The biomedical device also includes a first encapsulating layer, where the first encapsulating layer encapsulates at least the electroactive component and the battery.

Implementations may include one or more of the following features. The biomedical device where the battery further includes: an anode current collector; a cathode current collector; and an anode; where the anode includes zinc, and where the anode and the anode current collector are a single layer. The biomedical device may also include a polymer electrolyte, where the electrolyte includes poly (vinylidene fluoride). In some examples, the polymer electrolyte includes zinc ion. In some examples, the battery may include manganese dioxide, and in some examples, the manganese dioxide cathode includes jet milled electrolytic manganese dioxide. The battery may be formed from a cathode slurry made from the manganese dioxide with polymeric binders and fillers such as poly(vinylidene fluoride) and carbon black. The battery may have an anode formed from zinc, where the zinc may be in a foil form in some examples.

The battery may include a seal in encapsulating films that enclose more than 90 percent of the battery portions not used for making external contacts. When formed with these layers, a laminated structure may be formed with hermetically sealed encapsulating such that thickness of the battery is less than 1 mm. In some examples, the battery is less than 500 microns thick. The battery in some further examples may have a thickness less than 250 microns.

Batteries may be formed in sheets and individual batteries may be cut out or singulated from the sheets. In some examples, the shape of the cut out batteries may be curvilinear One general aspect includes a method for forming a battery which involves obtaining a cathode collector film, where the cathode contact film includes titanium. The method also includes coating the cathode collector film with a carbon coating. The method also includes obtaining a first laminate layer, where the first laminate layer includes a first body and at least a first release layer and pressure sensitive adhesive upon surfaces of the body. The method also includes cutting a hole in the first laminate layer. The method also includes adhering the cathode collector film with the carbon coating to the first laminate layer, where the hole in the first laminate layer and the cathode collector film with carbon coating create a first cavity. The method also includes depositing a manganese dioxide slurry into the first cavity and upon the carbon coating. The method also includes drying the manganese dioxide deposit. The method also includes obtaining a second laminate layer, where the second laminate layer includes a second body and at least a second release layer and pressure sensitive adhesive upon surfaces of the second body. The method also includes cutting a hole in the second laminate layer. The method also includes adhering a zinc foil to the second laminate layer, where the hole in the second laminate layer and the zinc foil create a second cavity. The method also includes depositing a polymer electrolyte including ionic constituents into the second cavity. The method also includes drying the polymer electrolyte. The method also includes laminating the first laminate layer to the second laminate layer, where the first cavity and the second cavity align at least in a respective portion and the polymer electrolyte and the manganese dioxide deposit are laminated together. The method also includes cutting material from the laminate layers in a region peripheral to the first cavity and the second cavity. The method also includes encapsulating the zinc foil, polymer, manganese dioxide deposit, cathode collector, first laminate layer and second laminate layer in a biocompatible encapsulating film. The method of also includes the method further including singulating a battery element.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 3A illustrates a first stand-alone, packaged biocompatible energization element with exemplary anode and cathode connections.

FIG. 3B illustrates a second stand-alone, packaged biocompatible energization element with exemplary anode and cathode connections.

FIGS. 4A-4F illustrate exemplary method steps for the formation of biocompatible energization elements for biomedical devices.

FIGS. 6A-6C illustrate an alternative embodiment of an exemplary battery cell with a polymer electrolyte comprising a cavity layer.

FIGS. 7A-7J illustrate exemplary method steps for the formation of biocompatible energization elements for biomedical devices with laminate layers.

DETAILED DESCRIPTION OF THE PREFERRED EMBODIMENTS

Figure 1A:
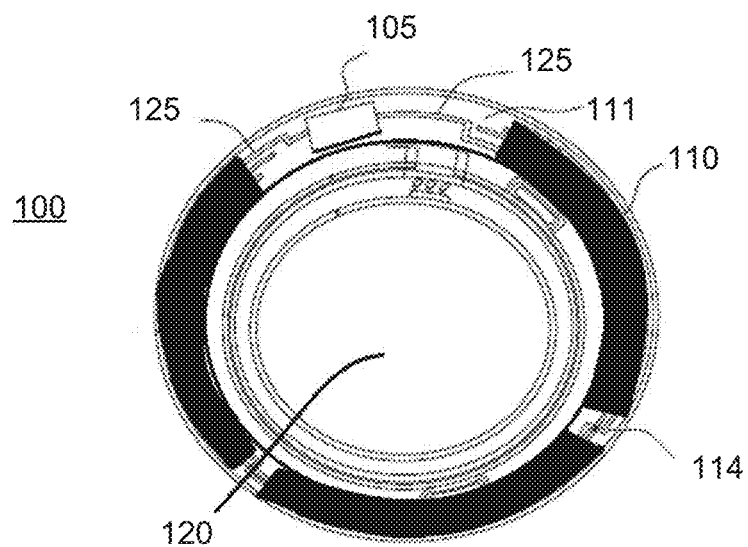
FIGS. 1A-1D illustrate exemplary aspects of biocompatible energization elements in concert with the exemplary application of contact lenses.

Methods of forming and using biocompatible batteries with polymer primary battery chemistry are disclosed in this application. The polymer electrolyte is a key component that creates a battery with improved ability to contain battery chemistry within encapsulation and to lower the forces upon internal battery components contained within packaging or encapsulation. In the following sections, detailed descriptions of various examples are described. The descriptions of examples are exemplary embodiments only, and various modifications and alterations may be apparent to those skilled in the art. Therefore, the examples do not limit the scope of this application. The anode formulations, and the structures that they are formed into, may be designed for use in biocompatible batteries. In some examples, these biocompatible batteries may be designed for use in, or proximate to, the body of a living organism.

An important need for the performance of biocompatible batteries relates to the sensitivity of these batteries to their environment, and in particular to the moisture in their environment. Batteries that have aqueous electrolyte formulations may be significantly sensitive in these ways. In some cases, if encapsulation strategies do not prevent movement of water, water may move out of the battery into its surrounding environment, and this may result in the electrolyte drying up with significant impact to battery performance parameters such as internal resistance. In some other cases, water may *diffuse* into batteries if encapsulation strategies allow water to cross them, even in small quantities. The result of water diffusing into these batteries may result in diluting the electrolyte with an impact on battery performance and in swelling of the battery body which may result in rupture of the battery encapsulation with potentially significant impacts. Methods to formulate polymeric battery electrolytes may result in batteries that are relatively insensitive to ingress or egress of materials such as moisture. Such improvements may improve performance and/or decrease requirements on sealing and encapsulating processes.

A battery with a polymer electrolyte which results in batteries that are relatively insensitive to their environment may have numerous benefits above and beyond the basic need for such an insensitive battery. For example, such a polymer electrolyte, may have significantly improved biocompatibility since the electrolyte cannot leak out as easily. As well, the resulting electrolyte and in some examples the separator that it forms may be more resilient to downstream processing steps which may be necessary in the processing of a biomedical device, for example, high temperature and low vacuum necessary for over molding. There may be numerous manners to form polymer based electrolytes with these properties.

Glossary

In the description and claims below, various terms may be used for which the following definitions will apply:

"Anode" as used herein refers to an electrode through which electric current flows into a polarized electrical device. The direction of electric current is typically opposite to the direction of electron flow. In other words, the electrons flow from the anode into, for example, an electrical circuit.

"Binder" as used herein refers to a polymer that is capable of exhibiting elastic responses to mechanical deformations and that is chemically compatible with other energization element components. For example, binders may include electroactive materials, electrolytes, polymers, etc.

"Biocompatible" as used herein refers to a material or device that performs with an appropriate host response in a specific application. For example, a biocompatible device does not have toxic or injurious effects on biological systems.

"Cathode" as used herein refers to an electrode through which electric current flows out of a polarized electrical device. The direction of electric current is typically opposite to the direction of electron flow. Therefore, the electrons flow into the cathode of the polarized electrical device, and out of, for example, the connected electrical circuit.

"Coating" as used herein refers to a deposit of material in thin forms. In some uses, the term will refer to a thin deposit that substantially covers the surface of a substrate it is formed upon. In other more specialized uses, the term may be used to describe small thin deposits in smaller regions of the surface.

"Electrode" as used herein may refer to an active mass in the energy source. For example, it may include one or both of the anode and cathode.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include batteries. The batteries may be formed from alkaline type cell chemistry and may be solid-state batteries or wet cell batteries.

"Fillers" as used herein refer to one or more energization element separators that do not react with either acid or alkaline electrolytes. Generally, fillers may include substantially water insoluble materials such as carbon black; coal dust; graphite; metal oxides and hydroxides such as those of silicon, aluminum, calcium, magnesium, barium, titanium, iron, zinc, and tin; metal carbonates such as those of calcium and magnesium; minerals such as mica, montmorollonite, kaolinite, attapulgite, and talc; synthetic and natural zeolites such as Portland cement; precipitated metal silicates such as calcium silicate; hollow or solid polymer or glass microspheres, flakes and fibers; etc.

"Functionalized" as used herein refers to making a layer or device able to perform a function including, for example, energization, activation, and/or control.

"Mold" as used herein refers to a rigid or semi-rigid object that may be used to form three-dimensional objects from uncured formulations. Some exemplary molds include two mold parts that, when opposed to one another, define the structure of a three-dimensional object.

"Power" as used herein refers to work done or energy transferred per unit of time.

"Rechargeable" or "Re-energizable" as used herein refer to a capability of being restored to a state with higher capacity to do work. Many uses may relate to the capability of being restored with the ability to flow electrical current at a certain rate for certain, reestablished time periods.

"Reenergize" or "Recharge" as used herein refer to restoring to a state with higher capacity to do work. Many uses may relate to restoring a device to the capability to flow electrical current at a certain rate for a certain reestablished time period.

"Released" as used herein and sometimes referred to as "released from a mold" means that a three-dimensional object is either completely separated from the mold, or is only loosely attached to the mold, so that it may be removed with mild agitation.

"Stacked" as used herein means to place at least two component layers in proximity to each other such that at least a portion of one surface of one of the layers contacts a first surface of a second layer. In some examples, a coating, whether for adhesion or other functions, may reside between the two layers that are in contact with each other through said coating.

"Traces" as used herein refer to energization element components capable of connecting together the circuit components. For example, circuit traces may include copper or gold when the substrate is a printed circuit board and may typically be copper, gold or printed film in a flexible circuit. A special type of "Trace" is the current collector. Current collectors are traces with electrochemical compatibility that make the current collectors suitable for use in conducting electrons to and from an anode or cathode in the presence of electrolyte.

The methods and apparatus presented herein relate to forming biocompatible energization elements for inclusion within or on flat or three-dimensional biocompatible devices. A particular class of energization elements may be batteries that are fabricated in layers. The layers may also be classified as laminate layers. A battery formed in this manner may be classified as a laminar battery.

There may be other examples of how to assemble and configure batteries according to the present invention, and some may be described in following sections. However, for many of these examples, there are selected parameters and characteristics of the batteries that may be described in their own right. In the following sections, some characteristics and parameters will be focused upon.

Exemplary Biomedical Device Construction with Biocompatible Energization Elements An example of a biomedical device that may incorporate the energization elements, batteries, of the present invention may be an electroactive focal-adjusting contact lens. Referring to FIG. 1A, an example of such a contact lens insert may be depicted as contact lens insert 100. In the contact lens insert 100, there may be an electroactive element 120 that may accommodate focal characteristic changes in response to controlling voltages. A circuit 105, to provide those controlling voltage signals as well as to provide other functions such as controlling sensing of the environment for external control signals, may be powered by a biocompatible battery element 110. As depicted in FIG. 1A, the battery element 110 may be found as multiple major pieces, in this case three pieces, and may include the various configurations of battery chemistry elements as has been discussed. The battery elements 110 may have various interconnect features to join together pieces as may be depicted underlying the region of interconnect 114. The battery elements 110 may be connected to a circuit element that may have its own substrate 111 upon which interconnect features 125 may be located. The circuit 105, which may be in the form of an integrated circuit, may be electrically and physically connected to the substrate 111 and its interconnect features 125.

Figure 1B:
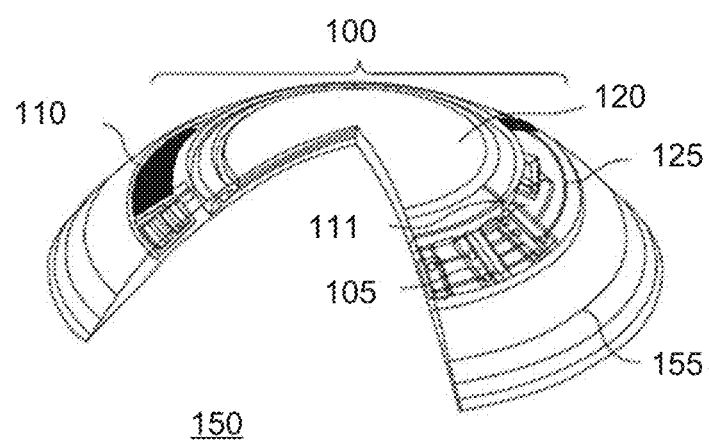

Referring to FIG. 1B, a cross sectional relief of a contact lens 150 may comprise contact lens insert 100 and its discussed constituents. The contact lens insert 100 may be encapsulated into a skirt of contact lens hydrogel 155 which may encapsulate the contact lens insert 100 and provide a comfortable interface of the contact lens 150 to a user's eye.

Figure 1C:
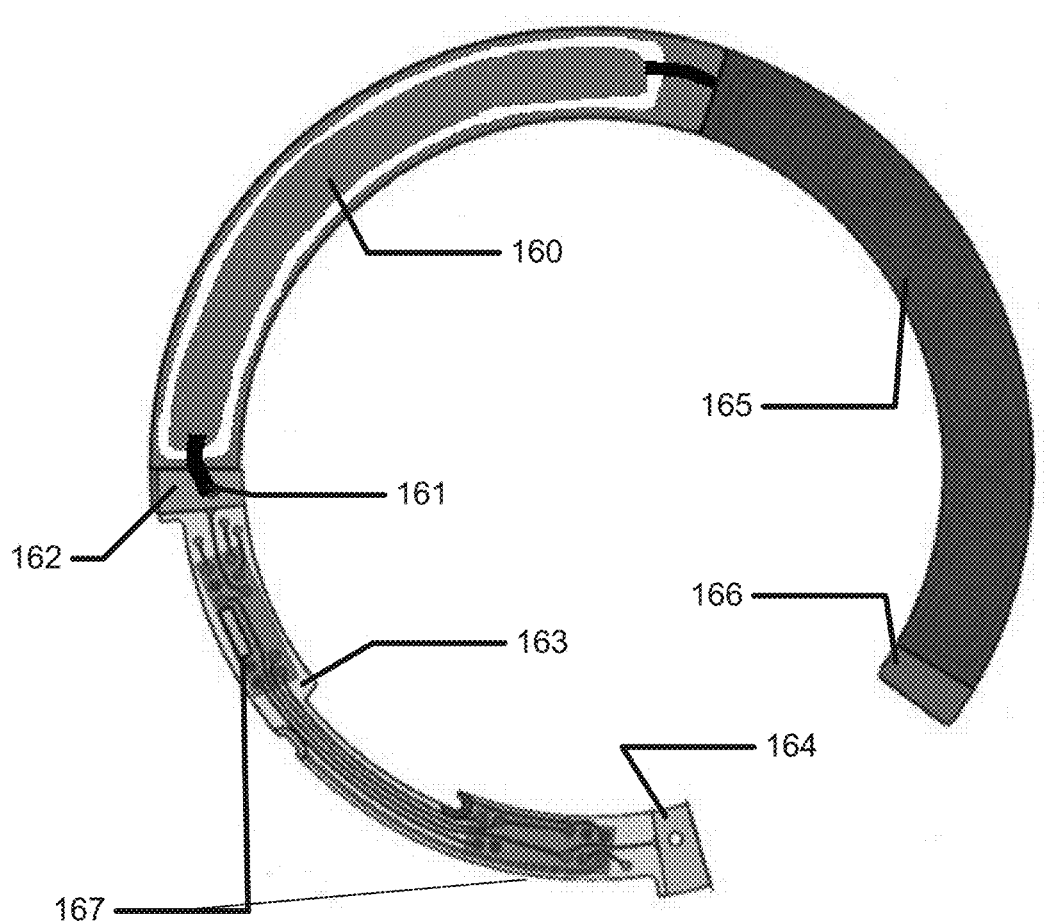
Figure 1D:
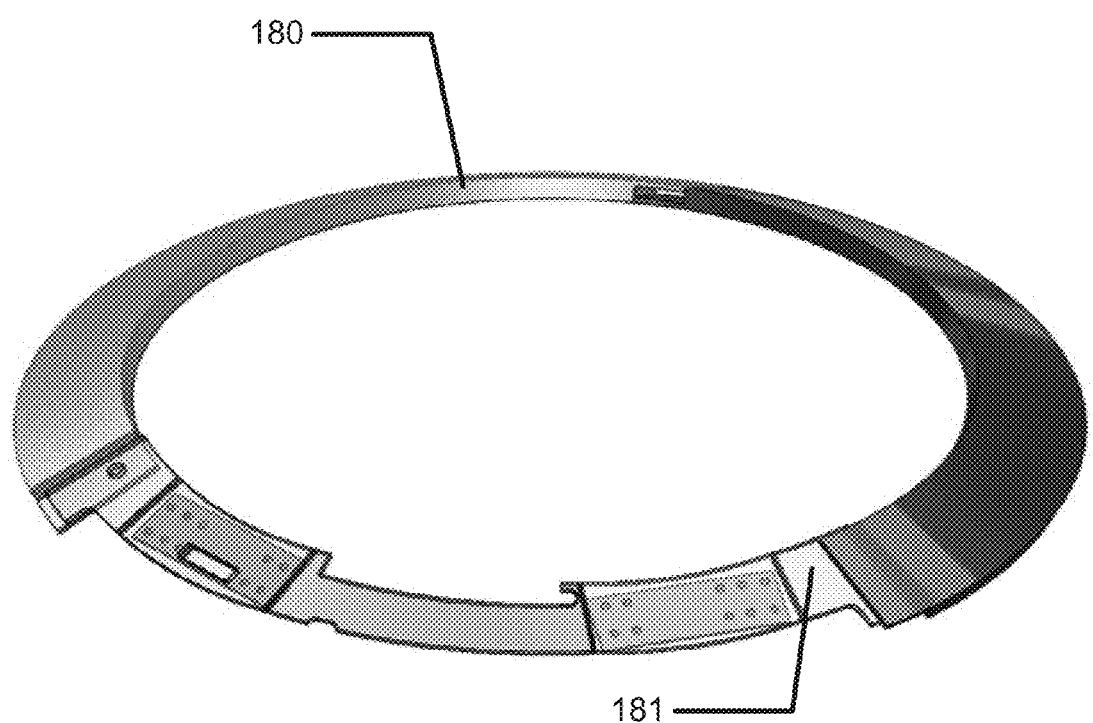

In reference to concepts of the present invention, the battery elements may be formed in a two-dimensional form as depicted in FIG. 1C. In this depiction there may be two main regions of battery cells in the regions of battery component 165 and the second battery component in the region of battery chemistry element 160. The battery elements, which are depicted in flat form in FIG. 1C, may connect to a circuit element 163, which in the example of FIG. 1C may comprise two major circuit areas 167. The circuit element 163 may connect to the battery element at an electrical contact 161 and a physical contact 162. The flat structure may be folded into a three-dimensional conical structure as has been described with respect to the present invention. In that process a second electrical contact 166 and a second physical contact 164 may be used to connect and physically stabilize the three-dimensional structure. Referring to FIG. 1D, a representation of this three-dimensional conical structure 180 may be found. The physical and electrical contact points 181 may also be found and the illustration may be viewed as a three-dimensional view of the resulting structure. This structure may include the modular electrical and battery component that will be incorporated with a lens insert into a biocompatible device. The example of a contact lens demonstrates how a biocompatible battery may be used in a biomedical device, but the example is not limiting as numerous other biomedical devices such as electronically active pills, stents, implants, skin tags and bandages, dental implants, wearable electronic devices and electronically active apparel and shoes may be non-limiting examples of biomedical devices where biocompatible polymer electrolytes batteries of the present disclosure may be utilized.

A Planar Polymer Electrolyte Battery Example

Figure 2:
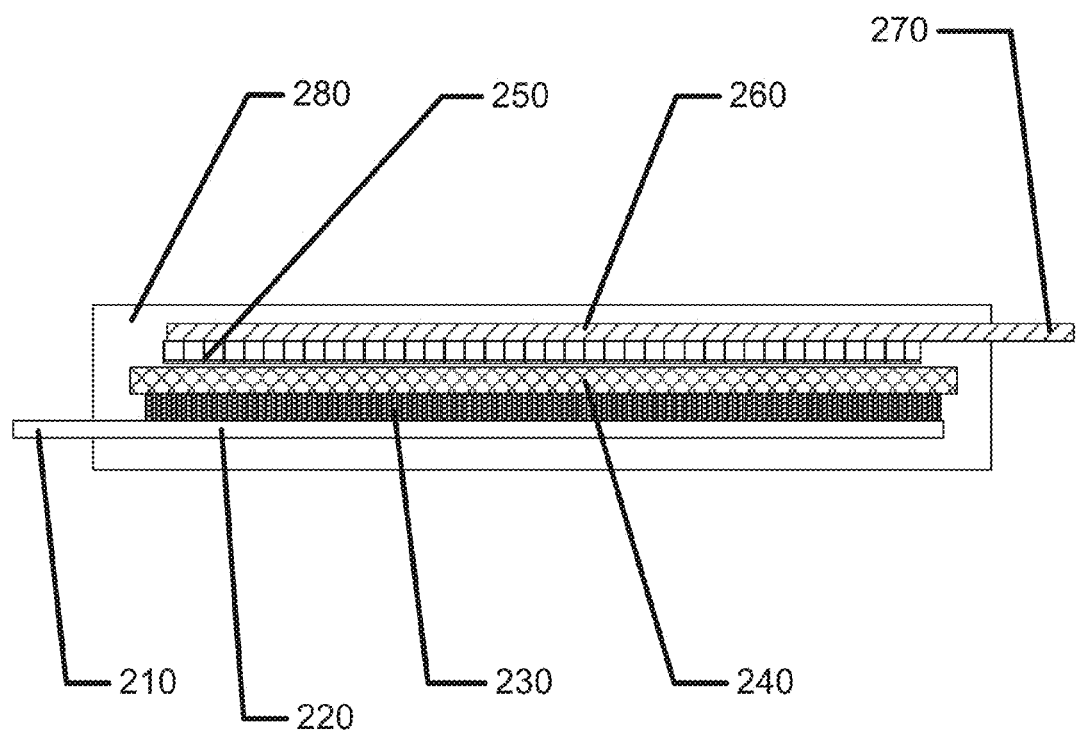
FIG. 2 illustrates an exemplary battery cell with a polymer electrolyte.

Referring to FIG. 2, an example of a planar polymer electrolyte battery is depicted in cross section. In later sections of the disclosure the components and methods for their assembly are discussed, but the cross section gives an example of how significant battery components may be organized for polymer electrolyte primary batteries. The battery may have cathode regions, anode regions, separator and electrolyte regions and encapsulation. A cathode current collector 220 may form a base of the device. The cathode current collector 220 may be a conductive metal piece formed from materials such as titanium, brass, stainless steel and the like. The cathode current collector 220 may be coated with various coatings to enhance surface binding and lower the resistance; a carbon coating is commonly used. A portion of the cathode current collector 220 may be exposed from encapsulation 280 and form a cathode collector contact 210. Surface coatings used inside the cell may either not be deposited in this region or alternatively may be removed to allow for effective external connection. Surface coatings may also be applied to the cathode collector contact 210 outside the cell to improve connections, for example silver epoxy, solder, or flux. The cathode 230 may be formed upon the cathode collector 220. The cathode 230 may comprise numerous components including the electroactive cathode chemistry such as $MnO_2$ in a non-limiting sense as well as binders, electrolytes, and other additives.

A polymer electrolyte 240 may be formed upon the cathode. In some examples, the electrolyte may be coated on top of the cathode or the anode. In other examples, the electrolyte may be applied by screen printing methods or dip coating methods. There may be numerous manners to apply the polymer electrolyte 240. The polymer electrolyte 240 may also function as a separator of the battery device.

On the other surface of the polymer electrolyte 240 may be the anode 250. The anode 250 may be a deposited film, a paste, a foil or solid film adhered to the polymer electrolyte 240. The anode 250 may be connected to the anode collector 260. A portion of the anode collector 260 may extend past the encapsulation 280 to create the anode collector contact 270. There may be numerous manners to form the exemplary structure depicted and the order of steps may vary; therefore, while a film may be described as formed upon another layer it may be assumed that the order may also be reversed. Furthermore, some elements may optionally be removed; such as, the anode collector 260 may be the same layer as the anode 250 in some examples.

Custom Shapes of Flat Battery Elements

In some examples of biocompatible batteries, the batteries may be formed as flat elements. Referring to FIG. 3A, an example of a rectangular outline 310 of the battery element may be depicted with an anode connection 311 and a cathode connection 312. Referring to FIG. 3B, an example of a circular outline 330 of a battery element may be depicted with an anode connection 331 and a cathode connection 332.

In some examples of flat-formed batteries, the outlines of the battery form may be dimensionally and geometrically configured to fit in custom products. In addition to examples with rectangular or circular outlines, custom "free-form" or "free shape" outlines may be formed which may allow the battery configuration to be optimized to fit within a given product.

In the exemplary biomedical device case of a variable optic, a "free-form" example of a flat outline may be arcuate in form. The free form may be of such geometry that when formed to a three-dimensional shape, it may take the form of a conical, annular skirt that fits within the constraining confines of a contact lens. It may be clear that similar beneficial geometries may be formed where medical devices have restrictive 2D or 3D shape requirements.

Electrical Requirements of Microbatteries

Another area for design considerations may relate to electrical requirements of the device, which may be provided by the battery. In order to function as a power source for a medical device, an appropriate battery may need to meet the full electrical requirements of the system when operating in a non-connected or non-externally powered mode. An emerging field of non-connected or non-externally powered biomedical devices may include, for example, vision-correcting contact lenses, health monitoring devices, pill cameras, and novelty devices. Recent developments in integrated circuit (IC) technology may permit meaningful electrical operation at very low current levels, for example, Pico amps of standby current and micro amps of operating current. IC's may also permit very small devices.

Microbatteries for biomedical applications may be required to meet many simultaneous, challenging requirements. For example, the microbattery may be required to have the capability to deliver a suitable operating voltage to an incorporated electrical circuit. This operating voltage may be influenced by several factors including the IC process "node," the output voltage from the circuit to another device, and a particular current consumption target which may also relate to a desired device lifetime.

With respect to the IC process, nodes may typically be differentiated by the minimum feature size of a transistor, such as its "so-called" transistor channel. This physical feature, along with other parameters of the IC fabrication, such as gate oxide thickness, may be associated with a resulting rating standard for "turn-on" or "threshold" voltages of field-effect transistors (FET's) fabricated in the given process node. For example, in a node with a minimum feature size of 0.5 microns, it may be common to find FET's with turn-on voltages of 5.0V. However, at a minimum feature size of 90 nm, the FET's may turn-on at 1.2, 1.8, and 2.5V. The IC foundry may supply standard cells of digital blocks, for example, inverters and flip-flops that have been characterized and are rated for use over certain voltage ranges. Designers chose an IC process node based on several factors including density of digital devices, analog/digital mixed signal devices, leakage current, wiring layers, and availability of specialty devices such as high-voltage FET's. Given these parametric aspects of the electrical components, which may draw power from a microbattery, it may be important for the microbattery power source to be matched to the requirements of the chosen process node and IC design, especially in terms of available voltage and current.

In some examples, an electrical circuit powered by a microbattery, may connect to another device. In non-limiting examples, the microbattery-powered electrical circuit may connect to an actuator or a transducer. Depending on the application, these may include a light-emitting diode (LED), a sensor, a microelectromechanical system (MEMS) pump, or numerous other such devices. In some examples, such connected devices may require higher operating voltage conditions than common IC process nodes. For example, a variable-focus lens may require 35V to activate. The operating voltage provided by the battery may therefore be a critical consideration when designing such a system. In some examples of this type of consideration, the efficiency of a lens driver to produce 35V from a 1V battery may be significantly less than it might be when operating from a 2V battery. Further requirements, such as die size, may be dramatically different considering the operating parameters of the microbattery as well.

Individual battery cells may typically be rated with open-circuit, loaded, and cutoff voltages. The open-circuit voltage is the potential produced by the battery cell with infinite load resistance. The loaded voltage is the potential produced by the cell with an appropriate, and typically also specified, load impedance placed across the cell terminals. The cutoff voltage is typically a voltage at which most of the battery has been discharged. The cutoff voltage may represent a voltage, or degree of discharge, below which the battery should not be discharged to avoid deleterious effects such as excessive gassing. The cutoff voltage may typically be influenced by the circuit to which the battery is connected, not just the battery itself, for example, the minimum operating voltage of the electronic circuit. In one example, an alkaline cell may have an open-circuit voltage of 1.6V, a loaded voltage in the range 1.0 to 1.5V, and a cutoff voltage of 1.0V. The voltage of a given microbattery cell design may depend upon other factors of the cell chemistry employed. And, different cell chemistry may therefore have different cell voltages.

Cells may be connected in series to increase voltage; however, this combination may come with tradeoffs to size, internal resistance, and battery complexity. Cells may also be combined in parallel configurations to decrease resistance and increase capacity; however, such a combination may tradeoff size and shelf life.

Battery capacity may be the ability of a battery to deliver current, or do work, for a period of time. Battery capacity may typically be specified in units such as micro amp-hours. A battery that may deliver 1 micro amp of current for 1 hour has 1 micro amp-hour of capacity. Capacity may typically be increased by increasing the mass (and hence volume) of reactants within a battery device; however, it may be appreciated that biomedical devices may be significantly constrained on available volume. Battery capacity may also be influenced by electrode and electrolyte material.

Depending on the requirements of the circuitry to which the battery is connected, a battery may be required to source current over a range of values. During storage prior to active use, a leakage current on the order of Pico amps to nan amps may flow through circuits, interconnects, and insulators. During active operation, circuitry may consume quiescent current to sample sensors, run timers, and perform such low power consumption functions. Quiescent current consumption may be on the order of nano amps to milliamps. Circuitry may also have even higher peak current demands, for example, when writing flash memory or communicating over radio frequency (RF). This peak current may extend to tens of milliamps or more. The resistance and impedance of a microbattery device may also be important to design considerations.

Shelf life typically refers to the period of time which a battery may survive in storage and still maintain useful operating parameters. Shelf life may be particularly important for biomedical devices for several reasons. Electronic devices may displace non-powered devices, as for example may be the case for the introduction of an electronic contact lens. Products in these existing market spaces may have established shelf life requirements, for example, three years, due to customer, supply chain, and other requirements. It may typically be desired that such specifications not be altered for new products. Shelf life requirements may also be set by the distribution, inventory, and use methods of a device including a microbattery. Accordingly, microbatteries for biomedical devices may have specific shelf life requirements, which may be, for example, measured in the number of years.

In some examples, three-dimensional biocompatible energization elements may be rechargeable. For example, an inductive coil may also be fabricated on the three-dimensional surface. The inductive coil could then be energized with a radio-frequency ("RF") fob. The inductive coil may be connected to the three-dimensional biocompatible energization element to recharge the energization element when RF is applied to the inductive coil. In another example, photovoltaics may also be fabricated on the three-dimensional surface and connected to the three-dimensional biocompatible energization element. When exposed to light or photons, the photovoltaics will produce electrons to recharge the energization element.

In some examples, a battery may function to provide the electrical energy for an electrical system. In these examples, the battery may be electrically connected to the circuit of the electrical system. The connections between a circuit and a battery may be classified as interconnects. These interconnects may become increasingly challenging for biomedical microbatteries due to several factors. In some examples, powered biomedical devices may be very small thus allowing little area and volume for the interconnects. The restrictions of size and area may impact the electrical resistance and reliability of the interconnections.

In other respects, a battery may contain a liquid electrolyte which could boil at high temperature. This restriction may directly compete with the desire to use a solder interconnect which may, for example, require relatively high temperatures such as 250 degrees Celsius to melt. Although in some examples, the battery chemistry, including the electrolyte, and the heat source used to form solder based interconnects, may be isolated spatially from each other. In the cases of emerging biomedical devices, the small size may preclude the separation of electrolyte and solder joints by sufficient distance to reduce heat conduction.

Interconnects

Interconnects may allow current to flow to and from the battery in connection with an external circuit. Such interconnects may interface with the environments inside and outside the battery, and may cross the boundary or seal between those environments. These interconnects may be considered as traces, making connections to an external circuit, passing through the battery seal, and then connecting to the current collectors inside the battery. As such, these interconnects may have several requirements. Outside the battery, the interconnects may resemble typical printed circuit traces. They may be soldered to, or otherwise connect to, other traces. In an example, where the battery is a separate physical element from a circuit board comprising an integrated circuit, the battery interconnect may allow for connection to the external circuit. This connection may be formed with solder, conductive tape, conductive ink or epoxy, or other means. The interconnect traces may need to survive in the environment outside the battery, for example, not corroding in the presence of oxygen.

As the interconnect passes through the battery seal, it may be of critical importance that the interconnect coexist with the seal and permit sealing. Adhesion may be required between the seal and interconnect in addition to the adhesion which may be required between the seal and battery package. Seal integrity may need to be maintained in the presence of electrolyte and other materials inside the battery. Interconnects, which may typically be metallic, may be known as points of failure in battery packaging. The electrical potential and/or flow of current may increase the tendency for electrolyte to "creep" along the interconnect. Accordingly, an interconnect may need to be engineered to maintain seal integrity.

Inside the battery, the interconnects may interface with the current collectors or may actually form the current collectors. In this regard, the interconnect may need to meet the requirements of the current collectors as described herein, or may need to form an electrical connection to such current collectors.

One class of candidate interconnects and current collectors is metal foils. Such foils are available in thickness of 25 microns or less, which make them suitable for very thin batteries. Such foil may also be sourced with low surface roughness and contamination, two factors which may be critical for battery performance. The foils may include zinc, nickel, brass, copper, titanium, other metals, and various alloys.

Modular Battery Components

In some examples, a modular battery component may be formed according to some aspects and examples of the present invention. In these examples, the modular battery assembly may be a separate component from other parts of the biomedical device. In the example of an ophthalmic contact lens device, such a design may include a modular battery that is separate from the rest of a media insert. There may be numerous advantages of forming a modular battery component. For example, in the example of the contact lens, a modular battery component may be formed in a separate, non-integrated process which may alleviate the need to handle rigid, three-dimensionally formed optical plastic components. In addition, the sources of manufacturing may be more flexible and may operate in a more parallel mode to the manufacturing of the other components in the biomedical device. Furthermore, the fabrication of the modular battery components may be decoupled from the characteristics of three-dimensional (3D) shaped devices. For example, in applications requiring three-dimensional final forms, a modular battery system may be fabricated in a flat or roughly two-dimensional (2D) perspective and then shaped to the appropriate three-dimensional shape. A modular battery component may be tested independently of the rest of the biomedical device and yield loss due to battery components may be sorted before assembly. The resulting modular battery component may be utilized in various media insert constructs that do not have an appropriate rigid region upon which the battery components may be formed; and, in a still further example, the use of modular battery components may facilitate the use of different options for fabrication technologies than might otherwise be utilized, such as, web-based technology (roll to roll), sheet-based technology (sheet-to-sheet), printing, lithography, and "squeegee" processing. In some examples of a modular battery, the discrete containment aspect of such a device may result in additional material being added to the overall biomedical device construct. Such effects may set a constraint for the use of modular battery solutions when the available space parameters require minimized thickness or volume of solutions.

Battery shape requirements may be driven at least in part by the application for which the battery is to be used. Traditional battery form factors may be cylindrical forms or rectangular prisms, made of metal, and may be geared toward products which require large amounts of power for long durations. These applications may be large enough that they may comprise large form factor batteries. In another example, planar (2D) solid-state batteries are thin rectangular prisms, typically formed upon inflexible silicon or glass. These planar solid-state batteries may be formed in some examples using silicon wafer-processing technologies. In another type of battery form factor, low power, flexible batteries may be formed in a pouch construct, using thin foils or plastic to contain the battery chemistry. These batteries may be made flat (2D), and may be designed to function when bowed to a modest out-of-plane (3D) curvature.

In some of the examples of the battery applications in the present invention where the battery may be employed in a variable optic lens, the form factor may require a three-dimensional curvature of the battery component where a radius of that curvature may be on the order of approximately 8.4 mm. The nature of such a curvature may be considered to be relatively steep and for reference may approximate the type of curvature found on a human fingertip. The nature of a relative steep curvature creates challenging aspects for manufacture. In some examples of the present invention, a modular battery component may be designed such that it may be fabricated in a flat, two-dimensional manner and then formed into a three-dimensional form of relative high curvature.

Battery Module Thickness

In designing battery components for biomedical applications, tradeoffs amongst the various parameters may be made balancing technical, safety and functional requirements. The thickness of the battery component may be an important and limiting parameter. For example, in an optical lens application the ability of a device to be comfortably worn by a user may have a critical dependence on the thickness across the biomedical device. Therefore, there may be critical enabling aspects in designing the battery for thinner results. In some examples, battery thickness may be determined by the combined thicknesses of top and bottom sheets, spacer sheets, and adhesive layer thicknesses. Practical manufacturing aspects may drive certain parameters of film thickness to standard values in available sheet stock. In addition, the films may have minimum thickness values to which they may be specified base upon technical considerations relating to chemical compatibility, moisture/gas impermeability, surface finish, and compatibility with coatings that may be deposited upon the film layers.

In some examples, a desired or goal thickness of a finished battery component may be a component thickness that is less than 220 µm. In these examples, this desired thickness may be driven by the three-dimensional geometry of an exemplary ophthalmic lens device where the battery component may need to be fit inside the available volume defined by a hydrogel lens shape given end user comfort, biocompatibility, and acceptance constraints. This volume and its effect on the needs of battery component thickness may be a function of total device thickness specification as well as device specification relating to its width, cone angle, and inner diameter. Another important design consideration for the resulting battery component design may relate to the volume available for active battery chemicals and materials in a given battery component design with respect to the resulting chemical energy that may result from that design. This resulting chemical energy may then be balanced for the electrical requirements of a functional biomedical device for its targeted life and operating conditions

Battery Module Flexibility

Another dimension of relevance to battery design and to the design of related devices that utilize battery based energy sources is the flexibility of the battery component. There may be numerous advantages conferred by flexible battery forms. For example, a flexible battery module may facilitate the previously mentioned ability to fabricate the battery form in a two-dimensional (2D) flat form. The flexibility of the form may allow the two-dimensional battery to then be formed into an appropriate 3D shape to fit into a biomedical device such as a contact lens.

In another example of the benefits that may be conferred by flexibility in the battery module, if the battery and the subsequent device is flexible then there may be advantages relating to the use of the device. In an example, a contact lens form of a biomedical device may have advantages for insertion/removal of the media insert based contact lens that may be closer to the insertion/removal of a standard, non-filled hydrogel contact lens.

The number of flexures may be important to the engineering of the battery. For example, a battery which may only flex one time from a planar form into a shape suitable for a contact lens may have significantly different design from a battery capable of multiple flexures. The flexure of the battery may also extend beyond the ability to mechanically survive the flexure event. For example, an electrode may be physically capable of flexing without breaking, but the mechanical and electrochemical properties of the electrode may be altered by flexure. Flex-induced changes may appear instantly, for example, as changes to impedance, or flexure may introduce changes which are only apparent in long-term shelf life testing.

Battery Module Width

There may be numerous applications into which the biocompatible energization elements or batteries of the present invention may be utilized. In general, the battery width requirement may be largely a function of the application in which it is applied. In an exemplary case, a contact lens battery system may have constrained needs for the specification on the width of a modular battery component. In some examples of an ophthalmic device where the device has a variable optic function powered by a battery component, the variable optic portion of the device may occupy a central spherical region of about 7.0 mm in diameter. The exemplary battery elements may be considered as a three-dimensional object, which fits as an annular, conical skirt around the central optic and formed into a truncated conical ring. If the required maximum diameter of the rigid insert is a diameter of 8.50 mm, and tangency to a certain diameter sphere may be targeted (as for example in a roughly 8.40 mm diameter), then geometry may dictate what the allowable battery width may be. There may be geometric models that may be useful for calculating desirable specifications for the resulting geometry which in some examples may be termed a conical frustum flattened into a sector of an annulus.

Flattened battery width may be driven by two features of the battery element, the active battery components and seal width. In some examples relating to ophthalmic devices a target thickness may be between 0.100 mm and 0.500 mm per side, and the active battery components may be targeted at approximately 0.800 mm wide. Other biomedical devices may have differing design constraints but the principles for flexible flat battery elements may apply in similar fashion.

Battery Element Internal Seals

It may be important in examples of polymer electrolyte batteries to incorporate sealing mechanisms that retard or prevent the movement of moisture or other chemicals into the battery body. Moisture barriers may be designed to keep the internal moisture level at a designed level, within some tolerance. In some examples, a moisture barrier may be divided into two sections or components; namely, the package and the seal. Polymer electrolytes may have an inherent advantage in that any leaking of moisture into the polymer electrolyte from external regions may have minimal impact, and may even improve battery performance in some examples. Thus, the importance of packaging requirements may be inherently reduced for polymer electrolyte batteries.

Nevertheless, the package may refer to the main material of the enclosure. In some examples, the package may comprise a bulk material. The Water Vapor Transmission Rate (WVTR) may be an indicator of performance, with ISO, ASTM standards controlling the test procedure, including the environmental conditions operant during the testing. Ideally, the WVTR for a good battery package may be "zero." Exemplary materials with a near-zero WVTR may be glass and metal foils. Plastics, on the other hand, may be inherently porous to moisture, and may vary significantly for different types of plastic. Engineered materials, laminates, or co-extrudes may usually be hybrids of the common package materials.

The seal may be the interface between two of the package surfaces. The connecting of seal surfaces finishes the enclosure along with the package. In many examples, the nature of seal designs may make them difficult to characterize for the seal's WVTR due to difficulty in performing measurements using an ISO or ASTM standard, as the sample size or surface area may not be compatible with those procedures. In some examples, a practical manner to testing seal integrity may be a functional test of the actual seal design, for some defined conditions. Seal performance may be a function of the seal material, the seal thickness, the seal length, the seal width, and the seal adhesion or intimacy to package substrates.

In some examples, seals may be formed by a welding process that may involve thermal, laser, solvent, friction, ultrasonic, or arc processing. In other examples, seals may be formed through the use of adhesive sealants such as glues, epoxies, acrylics, natural rubber, and synthetic rubber. Other examples may derive from the utilization of gasket type material that may be formed from cork, natural and synthetic rubber, polytetrafluoroethylene (PTFE), polypropylene, and silicones to mention a few non-limiting examples.

In some examples, the batteries according to the present invention may be designed to have a specified operating life. The operating life may be estimated by determining a practical amount of moisture permeability that may be obtained using a particular battery system and then estimating when such a moisture leakage may result in an end of life condition for the battery.

Additional Package and Substrate Considerations in Biocompatible Battery Modules There may be numerous packaging and substrate considerations that may dictate desirable characteristics for package designs used in biocompatible laminar microbatteries. For example, the packaging may desirably be predominantly foil and/or film based where these packaging layers may be as thin as possible, for example, 10 to 50 microns. Additionally, the packaging may provide a sufficient diffusion barrier to moisture gain or loss during the shelf life. In many desirable examples, the packaging may provide a sufficient diffusion barrier to oxygen ingress to limit degradation of zinc anodes by direct oxidation.

In some examples, the packaging may provide a finite permeation pathway to hydrogen gas that may evolve due to direct reduction of water by zinc. And, the packaging may desirably sufficiently contain and may isolate the contents of the battery such that potential exposure to a user may be minimized.

In the present invention, packaging constructs may include the following types of functional components: top and bottom packaging layers, pressure sensitive adhesive (PSA) layers, spacer layers, interconnect zones, filling ports, and secondary packaging.

In some examples, top and bottom packaging layers may comprise metallic foils or polymer films. Top and bottom packaging layers may comprise multi-layer film constructs containing a plurality of polymer and/or barrier layers. Such film constructs may be referred to as coextruded barrier laminate films. An example of a commercial coextruded barrier laminate film of particular utility in the present invention may be 3M® Scotchpak 1109 backing which consists of a polyethylene terephthalate (PET) carrier web, a vapor-deposited aluminum barrier layer, and a polyethylene layer including a total average film thickness of 33 microns. Numerous other similar multilayer barrier films may be available and may be used in alternate examples of the present invention.

In design constructions including a PSA, packaging layer surface roughness may be of particular importance because the PSA may also need to seal opposing packaging layer faces. Surface roughness may result from manufacturing processes used in foil and film production, for example, processes employing rolling, extruding, embossing and/or calendaring, among others. If the surface is too rough, PSA may be not able to be applied in a uniform thickness when the desired PSA thickness may be on the order of the surface roughness Ra (the arithmetic average of the roughness profile). Furthermore, PSA's may not adequately seal against an opposing face if the opposing face has roughness that may be on the order of the PSA layer thickness. In the present invention, packaging materials having a surface roughness, Ra, less than 10 microns may be acceptable examples. In some examples, surface roughness values may be 5 microns or less. And, in still further examples, the surface roughness may be 1 micron or less. Surface roughness values may be measured by a variety of methods including but not limited to measurement techniques such as white light interferometry, stylus profilometry, and the like. There may be many examples in the art of surface metrology that surface roughness may be described by a number of alternative parameters and that the average surface roughness, Ra, values discussed herein may be meant to be representative of the types of features inherent in the aforementioned manufacturing processes.

Current Collectors and Electrodes

In some examples of zinc carbon and Leclanche cells, the cathode current collector may be a sintered carbon rod. This type of material may face technical hurdles for thin electrochemical cells of the present invention. In some examples, printed carbon inks may be used in thin electrochemical cells to replace a sintered carbon rod for the cathode current collector, and in these examples, the resulting device may be formed without significant impairment to the resulting electrochemical cell. Typically, said carbon inks may be applied directly to packaging materials which may comprise polymer films, or in some cases metal foils. In the examples where the packaging film may be a metal foil, the carbon ink may need to protect the underlying metal foil from chemical degradation and/or corrosion by the electrolyte. Furthermore, in these examples, the carbon ink current collector may need to provide electrical conductivity from the inside of the electrochemical cell to the outside of the electrochemical cell, implying sealing around or through the carbon ink. Due to the porous nature of carbon inks, this may be not easily accomplished without significant challenges. Carbon inks also may be applied in layers that have finite and relatively small thickness, for example, 10 to 20 microns. In a thin electrochemical cell design in which the total internal package thickness may only be about 100 to 150 microns, the thickness of a carbon ink layer may take up a significant fraction of the total internal volume of the electrochemical cell, thereby negatively impacting electrical performance of the cell. Further, the thin nature of the overall battery and the current collector in particular may imply a small cross-sectional area for the current collector. As resistance of a trace increases with trace length and decreases with cross-sectional area, there may be a direct tradeoff between current collector thickness and resistance. The bulk resistivity of carbon ink may be insufficient to meet the resistance requirement of thin batteries. Inks filled with silver or other conductive metals may also be considered to decrease resistance and/or thickness, but they may introduce new challenges such as incompatibility with novel electrolytes. In consideration of these factors, in some examples it may be desirable to realize efficient and high performance thin electrochemical cells of the present invention by utilizing a thin metal foil as the current collector, or to apply a thin metal film to an underlying polymer packaging layer to act as the current collector. Such metal foils may have significantly lower resistivity, thereby allowing them to meet electrical resistance requirements with much less thickness than printed carbon inks.

In some examples, one or more of the top and/or bottom packaging layers may serve as a substrate for a sputtered current collector metal or metal stack. For example, 3M® Scotchpak 1109 backing may be metallized using physical vapor deposition (PVD) of one or more metallic layers useful as a current collector for a cathode. Exemplary metal stacks useful as cathode current collectors may be Ti—W (titanium-tungsten) adhesion layers and Ti (titanium) conductor layers. Exemplary metal stacks useful as anode current collectors may be Ti—W adhesion layers, Au (gold) conductor layers, and In (indium) deposition layers. The thickness of the PVD layers may be less than 500 nm in total. If multiple layers of metals are used, the electrochemical and barrier properties may need to be compatible with the battery. For example, copper may be electroplated on top of a seed layer to grow a thick layer of conductor. Additional layers may be plated upon the copper. However, copper may be electrochemically incompatible with certain electrolytes especially in the presence of zinc. Accordingly, if copper is used as a layer in the battery, it may need to be sufficiently isolated from the battery electrolyte. Alternatively, copper may be excluded or another metal substituted.

In some other examples, top and/or bottom packaging foils may also function as current collectors. For example, a 25 micron brass foil may be useful as an anode current collector for a zinc anode. The brass foil may be optionally electroplated with indium prior to electroplating with zinc. In one example, cathode current collector packaging foils may comprise titanium foil, Hastelloy C-276 foil, chromium foil, and/or tantalum foil. In certain designs, one or more packaging foils may be fine blanked, embossed, etched, textured, laser machined, or otherwise processed to provide desirable form, surface roughness, and/or geometry to the final cell packaging.

Cathode Mixture

There may be numerous cathode chemistry mixtures that may be consistent with the concepts of the present invention. In some examples, a cathode mixture, which may be a term for a chemical formulation used to form a battery's cathode, may be applied as a paste, gel, suspension, or slurry, and may comprise a transition metal oxide such as manganese dioxide, some form of conductive additive which, for example, may be a form of conductive powder such as carbon black or graphite, and a water-soluble polymer such as polyvinylpyrrolidone (PVP) or some other binder additive. In some examples, other components may be included such as one or more of binders, electrolyte salts, corrosion inhibitors, water or other solvents, surfactants, rheology modifiers, and other conductive additives, such as, conductive polymers. Once formulated and appropriately mixed, the cathode mixture may have a desirable rheology that allows it to either be dispensed onto desired portions of the separator and/or cathode current collector, or squeegeed through a screen or stencil in a similar manner. In some examples, the cathode mixture may be dried before being used in later cell assembly steps, while in other examples, the cathode may contain some or all of the electrolyte components, and may only be partially dried to a selected moisture content.

The transition metal oxide may, for example, be manganese dioxide. The manganese dioxide which may be used in the cathode mixture may be, for example, electrolytic manganese dioxide (EMD) due to the beneficial additional specific energy that this type of manganese dioxide provides relative to other forms, such as natural manganese dioxide (NMD) or chemical manganese dioxide (CMD). Furthermore, the EMD useful in batteries of the present invention may need to have a particle size and particle size distribution that may be conducive to the formation of depositable or printable cathode mixture pastes/slurries. Specifically, the EMD may be processed to remove significant large particulate components that may be considered large relative to other features such as battery internal dimensions, separator thicknesses, dispense tip diameters, stencil opening sizes, or screen mesh sizes. Particle size optimization may also be used to improve performance of the battery, for example, internal impedance and discharge capacity.

Milling is the reduction of solid materials from one average particle size to a smaller average particle size, by crushing, grinding, cutting, vibrating, or other processes. Milling may also be used to free useful materials from matrix materials in which they may be embedded, and to concentrate minerals. A mill is a device that breaks solid materials into smaller pieces by grinding, crushing, or cutting. There may be several means for milling and many types of materials processed in them. Such means of milling may include: ball mill, bead mill, mortar and pestle, roller press, and jet mill among other milling alternatives. One example of milling may be jet milling. After the milling, the state of the solid is changed, for example, the particle size, the particle size disposition and the particle shape. Aggregate milling processes may also be used to remove or separate contamination or moisture from aggregate to produce "dry fills" prior to transport or structural filling. Some equipment may combine various techniques to sort a solid material into a mixture of particles whose size is bounded by both a minimum and maximum particle size. Such processing may be referred to as "classifiers" or "classification."

Milling may be one aspect of cathode mixture production for uniform particle size distribution of the cathode mixture ingredients. Uniform particle size in a cathode mixture may assist in viscosity, rheology, electroconductivity, and other properties of a cathode. Milling may assist these properties by controlling agglomeration, or a mass collection, of the cathode mixture ingredients. Agglomeration—the clustering of disparate elements, which in the case of the cathode mixture, may be carbon allotropes and transition metal oxides—may negatively affect the filling process by leaving voids.

Also, filtration may be another important step for the removal of agglomerated or unwanted particles. Unwanted particles may include over-sized particles, contaminates, or other particles not explicitly accounted for in the preparation process. Filtration may be accomplished by means such as filter-paper filtration, vacuum filtration, chromatography, microfiltration, and other means of filtration.

In some examples, EMD may have an average particle size of 7 microns with a large particle content that may contain particulates up to about 70 microns. In alternative examples, the EMD may be sieved, further milled, or otherwise separated or processed to limit large particulate content to below a certain threshold, for example, 25 microns or smaller.

The cathode may also comprise silver dioxide or nickel oxyhydroxide. Such materials may offer increased capacity and less decrease in loaded voltage during discharge relative to manganese dioxide, both desirable properties in a battery. Batteries based on these cathodes may have current examples present in industry and literature. A novel microbattery utilizing a silver dioxide cathode may include a biocompatible electrolyte, for example, one comprising zinc chloride and/or ammonium chloride instead of potassium hydroxide.

Some examples of the cathode mixture may include a polymeric binder. The binder may serve a number of functions in the cathode mixture. The primary function of the binder may be to create a sufficient inter-particle electrical network between EMD particles and carbon particles. A secondary function of the binder may be to facilitate mechanical adhesion and electrical contact to the cathode current collector. A third function of the binder may be to influence the rheological properties of the cathode mixture for advantageous dispensing and/or stenciling/screening. Still, a fourth function of the binder may be to enhance the electrolyte uptake and distribution within the cathode.

The choice of the binder polymer as well as the amount to be used may be beneficial to the function of the cathode in the electrochemical cell of the present invention. If the binder polymer is too soluble in the electrolyte to be used, then the primary function of the binder—electrical continuity—may be drastically impacted to the point of cell non-functionality. On the contrary, if the binder polymer is insoluble in the electrolyte to be used, portions of EMD may be ionically insulated from the electrolyte, resulting in diminished cell performance such as reduced capacity, lower open circuit voltage, and/or increased internal resistance.

The binder may be hydrophobic; it may also be hydrophilic. Examples of binder polymers useful for the present invention comprise PVP, polyisobutylene (PIB), rubbery triblock copolymers comprising styrene end blocks such as those manufactured by Kraton Polymers, styrene-butadiene latex block copolymers, polyacrylic acid, hydroxyethylcellulose, carboxymethylcellulose, fluorocarbon solids such as polytetrafluoroethylene, among others.

A solvent may be one component of the cathode mixture. A solvent may be useful in wetting the cathode mixture, which may assist in the particle distribution of the mixture. One example of a solvent may be toluene. Also, a surfactant may be useful in wetting, and thus distribution, of the cathode mixture. One example of a surfactant may be a detergent, such as Triton™ QS-44. Triton™ QS-44 may assist in the dissociation of aggregated ingredients in the cathode mixture, allowing for a more uniform distribution of the cathode mixture ingredients.

A conductive carbon may typically be used in the production of a cathode. Carbon is capable of forming many allotropes, or different structural modifications. Different carbon allotropes have different physical properties allowing for variation in electroconductivity. For example, the "springiness" of carbon black may help with adherence of a cathode mixture to a current collector. However, in energization elements requiring relatively low amounts of energy, these variations in electroconductivity may be less important than other favorable properties such as density, particle size, heat conductivity, and relative uniformity, among other properties. Examples of carbon allotropes include: diamond, graphite, graphene, amorphous carbon (informally called carbon black), buckminsterfullerenes, glassy carbon (also called vitreous carbon), carbon aerogels, and other possible forms of carbon capable of conducting electricity. One example of a carbon allotrope may be graphite.

Once the cathode mixture has been formulated and processed, the mixture may be dispensed, applied, and/or stored onto a surface such as the hydrogel separator, or the cathode current collector, or into a volume such as the cavity in the laminar structure. Filing onto a surface may result in a volume being filled over time. In order to apply, dispense, and/or store the mixture, a certain rheology may be desired to optimize the dispensing, applying, and/or storing process. For example, a less viscous rheology may allow for better filling of the cavity while at the same time possibly sacrificing particle distribution. A more viscous rheology may allow for optimized particle distribution, while possibly decreasing the ability to fill the cavity and possibly losing electroconductivity.

Anodes and Anode Corrosion Inhibitors

The anode for the laminar battery of the present invention may, for example, comprise zinc. In traditional zinc-carbon batteries, a zinc anode may take the physical form of a can in which the contents of the electrochemical cell may be contained. For the battery of the present invention, a zinc can may be an example but there may be other physical forms of zinc that may prove desirable to realize ultra-small battery designs.

Electroplating of zinc is a process type in numerous industrial uses, for example, for the protective or aesthetic coating of metal parts. In some examples, electroplated zinc may be used to form thin and conformal anodes useful for batteries of the present invention. Furthermore, the electroplated zinc may be patterned in many different configurations, depending on the design intent. A facile means for patterning electroplated zinc may be processing with the use of a photomask or a physical mask. In the case of the photomask, a photoresist may be applied to a conductive substrate, the substrate on which zinc may subsequently be plated. The desired plating pattern may be then projected to the photoresist by means of a photomask, thereby causing curing of selected areas of photoresist. The uncured photoresist may then be removed with appropriate solvent and cleaning techniques. The result may be a patterned area of conductive material that may receive an electroplated zinc treatment. While this method may provide benefit to the shape or design of the zinc to be plated, the approach may require use of available photopatternable materials, which may have constrained properties to the overall cell package construction. Consequently, new and novel methods for patterning zinc may be required to realize some designs of thin microbatteries of the present invention.

An alternative means of patterning zinc anodes may be by means of a physical mask application. A physical mask may be made by cutting desirable apertures in a film having desirable barrier and/or packaging properties. Additionally, the film may have pressure-sensitive adhesive applied to one or both sides. Finally, the film may have protective release liners applied to one or both adhesives. The release liner may serve the dual purpose of protecting the adhesive during aperture cutting and protecting the adhesive during specific processing steps of assembling the electrochemical cell, specifically the cathode filling step. In some examples, a zinc mask may comprise a PET film of approximately 100 microns thickness to which a pressure-sensitive adhesive may be applied to both sides in a layer thickness of approximately 10-20 microns. Both PSA layers may be covered by a PET release film which may have a low surface energy surface treatment, and may have an approximate thickness of 50 microns. In these examples, the multi-layer zinc mask may comprise PSA and PET film. PET films and PET/PSA zinc mask constructs as described herein may be desirably processed with precision nanosecond laser micromachining equipment, such as, Oxford Lasers E-Series laser micromachining workstation, to create ultra-precise apertures in the mask to facilitate later plating. In essence, once the zinc mask has been fabricated, one side of the release liner may be removed, and the mask with apertures may be laminated to the anode current collector and/or anode-side packaging film/foil. In this manner, the PSA creates a seal at the inside edges of the apertures, facilitating clean and precise masking of the zinc during electroplating.

The zinc mask may be placed and then electroplating of one or more metallic materials may be performed. In some examples, zinc may be electroplated directly onto an electrochemically compatible anode current collector foil such as brass. In alternate design examples where the anode side packaging comprises a polymer film or multi-layer polymer film upon which seed metallization has been applied, zinc, and/or the plating solutions used for depositing zinc, may not be chemically compatible with the underlying seed metallization. Manifestations of lack of compatibility may include film cracking, corrosion, and/or exacerbated $H_2$ evolution upon contact with cell electrolyte. In such a case, additional metals may be applied to the seed metal to affect better overall chemical compatibility in the system. One metal that may find particular utility in electrochemical cell constructions may be indium. Indium may be widely used as an alloying agent in battery grade zinc with its primary function being to provide an anti-corrosion property to the zinc in the presence of electrolyte. In some examples, indium may be successfully deposited on various seed metallizations such as Ti—W and Au. Resulting films of 1-3 microns of indium on said seed metallization layers may be low-stress and adherent. In this manner, the anode-side packaging film and attached current collector having an indium top layer may be conformable and durable. In some examples, it may be possible to deposit zinc on an indium-treated surface, the resulting deposit may be very non-uniform and nodular. This effect may occur at lower current density settings, for example, 20 amps per square foot (ASF). As viewed under a microscope, nodules of zinc may be observed to form on the underlying smooth indium deposit. In certain electrochemical cell designs, the vertical space allowance for the zinc anode layer may be up to about 5-10 microns thick, but in some examples, lower current densities may be used for zinc plating, and the resulting nodular growths may grow taller than the desired maximum anode vertical thickness. It may be that the nodular zinc growth stems from a combination of the high overpotential of indium and the presence of an oxide layer of indium.

In some examples, higher current density DC plating may overcome the relatively large nodular growth patterns of zinc on indium surfaces. For example, 100 ASF plating conditions may result in nodular zinc, but the size of the zinc nodules may be drastically reduced compared to 20 ASF plating conditions. Furthermore, the number of nodules may be vastly greater under 100 ASF plating conditions. The resulting zinc film may ultimately coalesce to a more or less uniform layer with only some residual feature of nodular growth while meeting the vertical space allowance of about 5-10 microns.

An added benefit of indium in the electrochemical cell may be reduction of $H_2$ formation, which may be a slow process that occurs in aqueous electrochemical cells containing zinc. The indium may be beneficially applied to one or more of the anode current collector, the anode itself as a co-plated alloying component, or as a surface coating on the electroplated zinc. For the latter case, indium surface coatings may be desirably applied in-situ by way of an electrolyte additive such as indium trichloride or indium acetate. When such additives may be added to the electrolyte in small concentrations, indium may spontaneously plate on exposed zinc surfaces as well as portions of exposed anode current collector. Zinc and similar anodes commonly used in commercial primary batteries may typically be found in sheet, rod, and paste forms. The anode of a miniature, biocompatible battery may be of similar form, e.g. thin foil, or may be plated as previously mentioned. The properties of this anode may differ significantly from those in existing batteries, for example, because of differences in contaminants or surface finish attributed to machining and plating processes. Accordingly, the electrodes and electrolyte may require special engineering to meet capacity, impedance, and shelf life requirements. For example, special plating process parameters, plating bath composition, surface treatment, and electrolyte composition may be needed to optimize electrode performance.

Polymer Electrolytes and Separators

There may be a number of different types of electrolyte formulations that are consistent with a polymer battery system. In a first class of examples, the electrolyte may be called a polymer electrolyte. In the polymer electrolyte systems the polymer backbone has regions that become involved in the conduction mechanisms of the ions. As well, these regions of the polymer backbone also facilitate the dissolution of the salt ions into the electrolyte bulk. In general, higher levels of dissolved ions in an electrolyte bulk may result in better battery performance characteristics. There may be numerous polymer and copolymer systems utilized to form the polymer backbone of the polymer electrolyte systems. In a non-limiting example polyethylene oxide (PEO) may be a common polymer constituent. The ionic conductivity of the system may improve at higher operating temperature conditions, but may be relatively poor at room temperature operating conditions. In some examples a sheet form of a polymer electrolyte may be formed including the presence of ionic species. The sheet form may be applied to an electrode with high temperature lamination processing. In other examples, the electrolyte formulation may be coated upon an electrode surface. Each of these processing options may be useful to enhance the binding of the electrolyte to electrodes which may generally result in poor adhesion under other processing conditions.

In another class of examples, plasticized polymer electrolytes may be utilized in polymer electrolyte battery systems. There may be many polymer systems that may be useful to form plasticized polymer electrolytes including as non-limiting examples PEO, poly(methyl methacrylate) (PMMA) and poly(vinyl chloride) amongst other polymer systems. The selected polymer backbone creates a two-dimensional or three-dimensional matrix into which a solvent and ionic solute system may be incorporated. The incorporation of the solvent system with dissolved ionic species "plasticizes" the polymer electrolyte. Unlike the first class of polymer electrolyte systems, the backbone of a plasticized polymer electrolyte system may not participate in the ionic transport across the electrolyte. The presence of the solvent is another difference from the first class of polymer electrolyte systems and does act to facilitate ionic transfer. In some examples, the ionic transport and related ionic conductivities of the battery structure may be higher in a plasticized polymer electrolyte system for these reasons. In some examples, the matrix of the plasticized polymer electrolyte system may improve characteristics related to the interfaces that are formed between the electrolyte and its neighboring layers. As with the first class of polymer electrolytes, the plasticized polymer electrolyte system may be laminated under high temperature conditions to improve adherence to the electrodes.

In an example, a plasticizer for use with poly (vinylidenefluoride) (PVDF) polymer or poly(vinylidene fluoride-hexafluoropropylene) (PVDF-HFP) copolymer electrode member compositions is propylene carbonate (PC). The effective proportion of this plasticizer, may depend not only on characteristics of a desired matrix polymer itself. The effective proportion may also be heavily influenced by the amounts and properties of other components of the composition, such as the volume and particle size of the active electrode material. For example, an effective amount of PC in a positive electrode formulation with PVDF-HFP may vary from about 60 percent to 300 percent by weight of the electrode matrix polymer component. Thus, in view of the numerous composition variables that are adjustable, the amount of plasticizer in any formulation may be determined empirically in the rather broad range of effective amounts and may depend upon use conditions or on tested electrical results.

In another exemplary class of electrolyte systems, gel electrolyte systems may be another type of electrolyte system used in polymer electrolyte batteries. A gel is a type of polymerization product that has different properties than a solidified polymer network. Gels consist of a solid three-dimensional network. The network typically may be formed by a copolymerization of branched monomers. The three dimensional network spans a volume of a liquid and binds it in place through surface tension effects. There may be numerous polymer systems that may form a gel electrolyte system such as PMMA, polyacrylonitrile (PAN), poly (vinylidene fluoride-hexafluoropropylene) (PVDF-HFP) and numerous other examples. The gel electrolytes may typically exhibit high ionic conductivity. High temperature lamination may be used to affix the gel polymer electrolyte to electrode surfaces with good adhesion characteristics. After the high temperature lamination processing, an electrolyte composition may be added to the attached gel polymer background much as a sponge absorbs a liquid composition.

The various classes of polymer electrolyte layers may be used in examples of polymer electrolyte batteries. Given a system including a type of anode material, ions consistent with transport of the anode material away from the anode may be included in the electrolyte as it is formed or in some examples, such as with the gel polymer electrolyte system, added later. The polymer network of each of the classes creates a layer that may act as a separator for the batteries as well.

In an example, a polymer electrolyte/separator film may be prepared by casting a portion of a coating composition onto a polished silicon wafer using a common spin-coating apparatus operated at a desired speed, such as 600 rpm, for a desired time, such as for 2 sec, to obtain a film of a desired thickness and uniformity. The film may be dried at room temperature for an appropriate time, such as for about 10 minutes within the confines of the coating apparatus. The coating composition may be prepared by suspending about 1.5 g of an 88:12 VDF:HFP copolymer of about 380×103 MW Kynar FLEX 2801 in about 9 g of anhydrous tetrohydrofuran (THF) and adding to this mixture about 1.5 g of a 1M solution of zinc acetate, or other appropriate electrolyte salts, in a 1:1 mixture by weight of ethylene carbonate (EC):propylene carbonate (PC). The completed mixture may be warmed to an elevated temperature, such as about 60 degrees C. for a period of time, such as 30 minutes, to facilitate dissolution. Occasional agitation of the solution may help to maintain the solution's fluidity. The resulting film may be used as a polymer electrolyte film according to the various examples to form battery cells presented in this discussion.

It may be useful in some examples to create a porous membrane that is made from a polymer backbone which is then impregnated with electrolyte. In a non-limiting example, a casting solution may be formed by mixing a roughly two-to-one ratio of poly(vinylidene fluoride) (PVDF) and poly(dimethylsiloxane) (PDMS) into a solvent mixture comprising N—N Dimethyl Acetamide (DMAc) and glycerol. The ratio of the DMAc to glycerol may be varied and may affect characteristics such as the porosity of the resulting separator layer. An excess of the solvent mixture may be used to allow for the shrinkage of the resulting layer in the cavity to form a thin separator layer. The resulting solution may be cast upon an electrolyte, rolled into a sheet, or extruded into a shape in some examples. Other manners of dispensing the casting solution may be consistent with the processes described herein. Thereafter, the structure may be immersed into a room temperature water bath for 20-40 hours to allow for the glycerol to dissolve out of the separator layer and result in a layer with a desired porosity. The polymer electrolyte layer may then be impregnated with a solution containing an appropriate solvent such as water and an electrolyte such as a zinc based salt.

Another means of producing a battery cell containing a polymer electrolyte with pores for incorporated electrolyte may be to start with a gel polymer such as a PVDF based system described above. Electrodes may be laminated to the polymer electrolyte with a heated double-roll laminator device at about 110 degrees C. and about 10 kg/cm roll pressure. After cooling, the laminate cell structure may be immersed in an appropriate solvent to extract electrode related plasticizer. In some examples, the solvent may include acetone, diethyl ether or NMP. The resulting structure may then be air dried until the surface solvent evaporates and thereafter may be placed in a circulating air oven at elevated temperature such as about 70 degrees C. for an hour or so to continue the removal of solvent, moisture and residual plasticizer. The processing may result in a well bonded work piece which may then be packaged in an hermetically sealed multilayer foil/polymer envelope in a helium atmosphere along with a measure of electrolyte such as a zinc salt dissolved in an appropriate solvent. The solvent and electrolyte may *diffuse* into the microporous membrane and impregnate it with electrically conductive electrolyte.

Another means of producing a battery cell containing a polymer electrolyte with pores for incorporated electrolyte may be to start with a commercial available microporous separator membrane. A laminated electrochemical battery cell may be prepared by assembling the electrodes including the cathode and the anode respectively along with a Celgard 2300 microporous separator which may contain the electrolyte. The electrodes may be laminated to the separator with a heated double-roll laminator device at about 110 degrees C. and about 10 kg/cm roll pressure.

Exemplary Illustrated Processing of Energization Element—Polymer Electrolyte

Referring to FIGS. 4A-4F, a demonstration of processing of a polymer electrolyte battery comprising a type of polymer electrolyte may be found. The various layers to be formed may be processed in various fashions and orders, but as an example, a process may start at FIG. 4A with obtaining a cathode collector 410. In an example, a thin foil or film of zinc metal may be used for the cathode collector. To aid in adhesion of the cathode layer, a surface treatment may be made to add a coating 415 to a surface of the titanium foil. In a non-limiting example the treatment may be a carbon coating such as offered by Lamart Corporation, Clifton, N.J., USA. In some examples a region of the titanium foil may be left untreated to form a cathode contact 416. In other examples, the entire foil may be treated to add a coating, and the coating may be removed in a later step to expose the cathode contact 416.

Next at FIG. 4B, a cathode mixture may be added upon the coating to form a cathode 420. There may be numerous means to add the coating including spraying, printing, and depositing with a squeegee or knife edge type layering process. In the knife edge layering, an amount of the cathode mixture may be deposited behind a knife edge while the knife edge is drawn along the cathode layer to result in a controlled layer with uniform thickness. In some other examples, a cathode may be formed by electrodepositing the cathode material upon a current conductor.

One example of a completed cathode mixture formulation may be formed as follows. A cathode powder blend composed of 88 percent Erachem $MnO_2$ powder, jet-milled by Hosikowa, may be combined with Super P Li carbon black, to a 5 percent composition and with Kynar 2801 PVDF to a 7 percent composition. An amount of zinc acetate may be dissolved in NMP such that when mixed with the cathode powder blend, the amount of zinc acetate is in a ratio of 1:10 for the zinc acetate mass to PVDF mass. When mixed the resulting slurry may be suspended in the NMP and this amount of NMP creates a formulation with 27 percent solids.

The resulting slurry may be mixed with a magnetic stir bar for 10 to 20 hours at a rate such as at roughly 400 rpm. The mixed slurry may be degassed. Degassing may be processed with a Thinky ARE-250 planetary centrifugal mixer at 2000 rpm for about 2 minutes.

The slurry may next be applied with a doctor blade to a thickness of about 30-80 microns. The slurry deposit may be made upon a sheet of 12.5 micron thick grade I titanium foil such as that available from Arnold Magnetics, which may be coated with a 1-3 micron thick layer of carbon. The cathode coating on the titanium foil may be dried in a heated laboratory oven for numerous hours, such as for a period of 18-24 hours where the temperature may In an example, be 50 degrees C.

Further enablement for the formulations and processing of cathode mixtures in biomedical devices may be found as set forth in U.S. patent application Ser. No. 14/746,204 filed Jun. 22, 2015, which is incorporated herein by reference.

Next, at FIG. 4C the polymer electrolyte 430 may be added to the growing structure. As mentioned there may be numerous types and classes of polymer electrolytes that may be applied. In an example, the gel polymer may be composed of Kynar 2801 with 30 weight percent zinc acetate. This mixture may be carried in a solvent blend including 36 percent DMSO and 64 percent NMP. This solution may then be applied to the cathode using a doctor blade. The resulting coating may be dried in a high temperature environment. In an example, the drying may be performed at around 50 degrees C. in laboratory oven for a number of hours, such as 3-6 hours. In some examples, a further drying step at an even higher temperature such as 100 degrees C. may be performed for some time, such as for 1 hour. This coating process may be repeated multiple times to achieve a targeted thickness.

There may be numerous manners to apply the polymer electrolyte layer such as by spray coating, printing, or squeegee or knife edge layering Here again, the deposited layer may be dried to remove an amount of the solvent.

Referring to FIG. 4D, a zinc anode 440 may be applied to the polymer electrolyte layer. Further enablement for the formulations and processing of anodes in biomedical devices may be found as set forth in U.S. patent application Ser. No. 14/819,634 filed Aug. 6, 2015, which is incorporated herein by reference.

In some examples the surface layer of the polymer electrolyte may have an additional amount of solvent or polymer electrolyte reapplied to aid in bonding between the polymer electrolyte and the anode layer. In other examples, the bonding process may proceed with no solvent or polymer electrolyte reapplication. There may be numerous manners to apply the zinc anode; however, in an example, a foil of zinc may be laminated to the polymer electrolyte. In some examples, the lamination process will apply heat and pressure while evacuating the gas phase around the region being applied. Lamination of electrodes with coated polymer electrolytes may be carried out between heated pressure rollers at a temperature and pressure level which does not significantly affect the polymer structure. For example, lamination may be carried out between 70 degrees C. and 130 degrees C., preferably between 100 degrees C. and 125 degrees C., and more preferably at about 110 degrees C. The pressure, in some examples, may be a linear pressure load between about 20 and 180 kilograms per centimeter (kg/cm), preferably between about 55 and 125 kg/cm. It may be apparent that the optimum temperature and pressure conditions will depend on the particular laminator construction and mode of its use.

In some examples, rolls of material may be processed in the manners described in FIGS. 4A-4C and then come together in the hot vacuum lamination process related to FIG. 4D. This processing may be referred to as a roll to roll manufacturing process.

Referring to FIG. 4E, the resulting polymer electrolyte battery device may be annealed in a thermal treatment 450 that will dry the structure. In some examples, the thermal treatment may also improve characteristics at the newly formed interfaces between the collectors, cathode, electrolyte and anode.

The function of the formed battery as well as its biocompatibility may depend strongly on encapsulating the polymer electrolyte battery structure in manners that isolate the battery structure from its environment while allowing battery contacts to be made to devices outside the encapsulation. The various means of encapsulation as have been discussed in sections on sealing and packaging heretofore may be used to perform the encapsulating step 460 illustrated in FIG. 4F.

Further enablement for the formulations and processing of anodes in biomedical devices may be found as set forth in U.S. patent application Ser. No. 14/827,613 filed Aug. 17, 2015, which is incorporated herein by reference.

In some examples, a pair of encapsulating films may be used to surround the battery element. The films may be precut in various locations to expose the regions where collector contacts are located. Thereafter, the two films may be brought around the battery element and joined together is a seal. In some examples, the seal may be formed by thermally treating the sealing layers to flow into each other and form a seal. In other related examples, a laser may be used to form a seal. There may be other sealing materials, such as glues and adhesives that may be added upon the formed seal to improve the seal integrity.

There may be other post processing that is performed upon the battery elements. In examples where rolls of material are treated to form the encapsulated battery elements, a subsequent process may singulate or cut out the battery elements from the resulting sheet that is formed. A laser may be used to cut out the batteries. In other examples a die may be used to punch out the battery elements with a specifically shaped cutting surface. As mentioned previously, some singulated battery designs may be rectilinear whereas other designs may be curvilinear, matching a curve of a contact lens insert piece for example.

Exemplary Performance Results for Polymer Electrolyte Batteries.

Figure 5B:
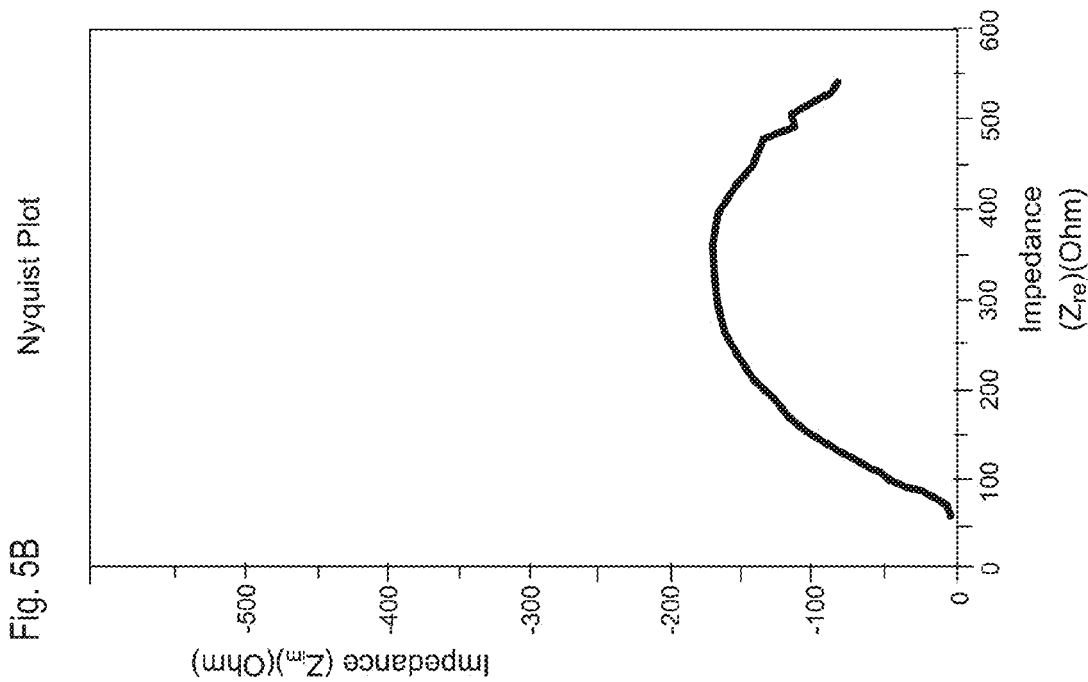
FIGS. 5A-5D illustrate exemplary battery characteristics for samples made with a polymer electrolyte according to the present invention.
Figure 5A:
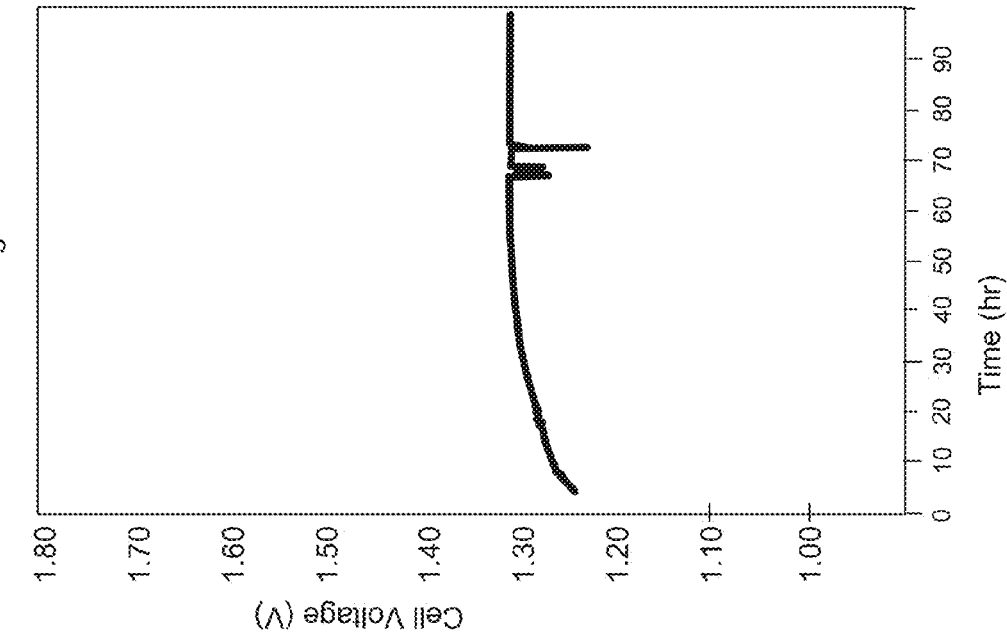
Figure 5C:
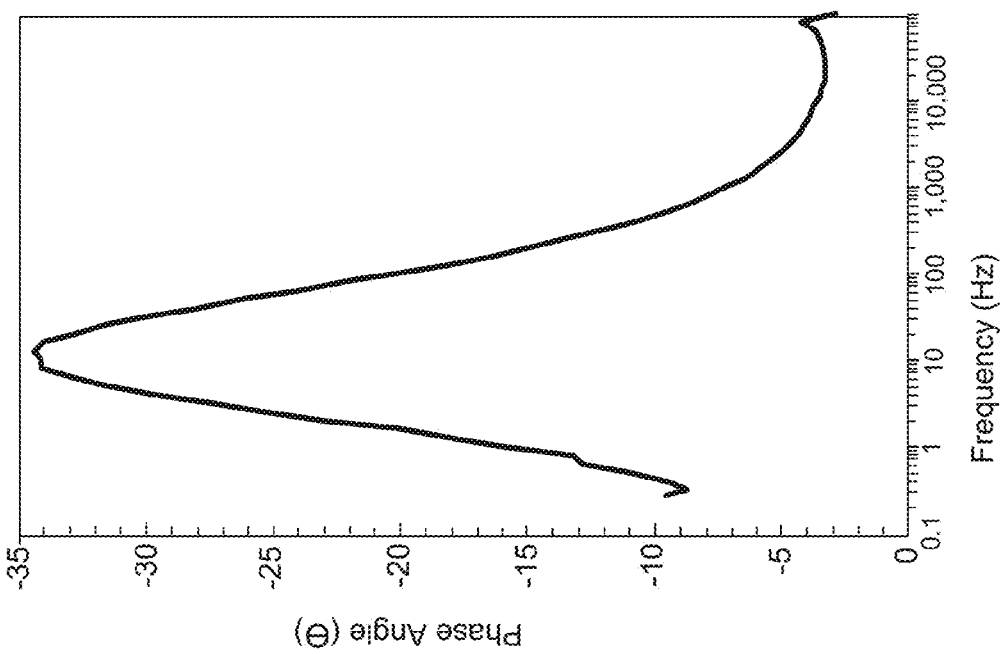
Figure 5D:
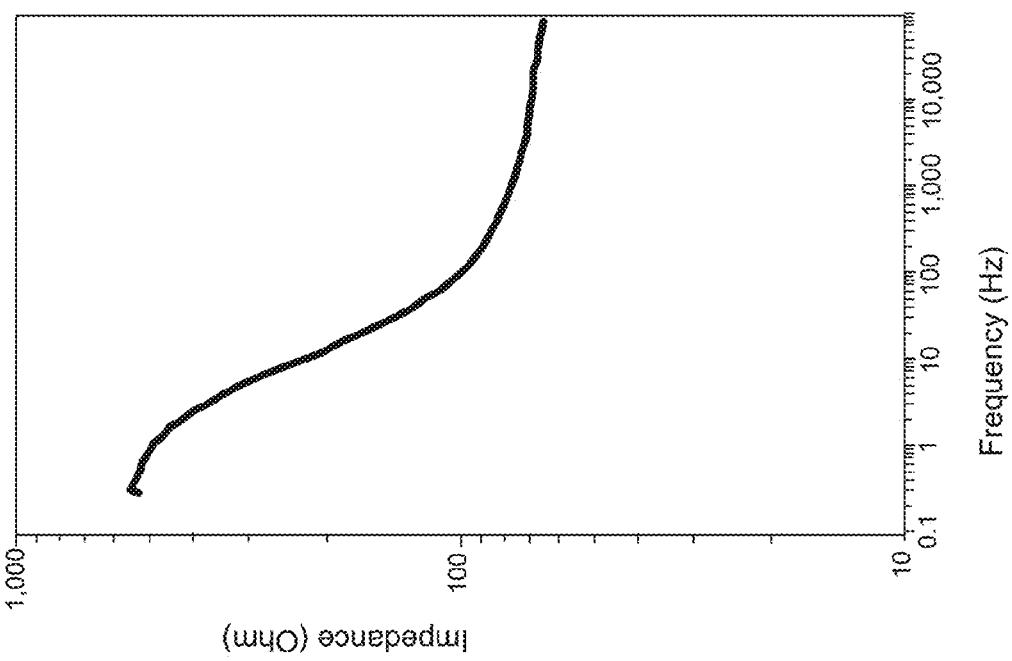

Exemplary samples of polymer electrolyte batteries have been formed utilizing the processing example referred to in relation to FIGS. 4A-4F. Referring to FIG. 5A-D, characterization results from the exemplary samples are found. Samples were formed with an overall form factor of 5 mm by 1 mm and a thickness of approximately 135 microns. For characterization data, the effective anode area for the battery samples was roughly $3 \times 10^{-3}$ cm$^2$. At FIG. 5A, the discharge characteristics of an exemplary battery cell may be found. A steady performance with a cell voltage of approximately 1.3V may be observed indicating good energy capacity and cell life performance. At FIG. 5B, frequency characterization of exemplary samples have been performed and a resulting "Nyquist" plot is displayed. At FIGS. 5C and 5D the raw frequency characters are displayed. FIG. 5C displays the impedance versus frequency results obtained. FIG. 5D displays the phase angle versus frequency results measured from exemplary samples.

A Cavity Based Approach to Polymer Primary Batteries

A cavity based laminate approach may provide means to manufacture polymer batteries of the type presented herein, an approach which may be particularly useful for batteries of curvilinear shape.

Further enablement for the cavity based devices and processing biomedical devices may be found as set forth in U.S. patent application Ser. No. 14/746,160 filed Jun. 22, 2015, which is incorporated herein by reference.

The cavity may allow for features that provide registration marks for the alignment of the various processing steps. Additionally, for processing involving knife edge layer deposition, the presence of an aligned cavity may facilitate efficient utilization of chemicals and foils. The laminate structure may also support the contact films regardless of the thickness of such films for a particular battery design.

The laminate layers used to form a cavity may also be subjected to punch type singulation in multiple steps. For example, the desired boundary region around a battery element may be cut out with a punch where the collector and anode contacts are not singulated. Thus, the batteries may be encapsulated in sheet form. This may be of particular value for curvilinear shaped battery elements.

Referring to FIGS. 6A-6C, an example of a modified cavity based battery cell is depicted with exemplary sealing/diffusion aspects. Note that the battery shape depicted is rectilinear; however, it may be understood that curvilinear shapes follow much the same processing. Exemplary details for the processing steps, such as formulations of the cathode slurry and the electrolyte casting mixture may be similar or identical to the examples described earlier in this description; thus, summary description is provided for those steps in the following example.

Beginning with FIG. 6A, a top-down view of an exemplary biocompatible energization element with polymer electrolytes and without encapsulation is illustrated. The peripheral region 601 may be isolated to allow for films from the top and bottom to encapsulate the energization element. The battery device may contain at least an anode current collector 602 with anode, and internal adhesives/sealants to connect the current collector to the laminate piece. The envelope capable of sealing the peripheral region 601 may comprise polymer film laminate pieces 609 capable of sealing, such as polypropylene as described in greater detail below. The internal adhesives/sealants may comprise pressure sensitive adhesives (PSA) such as polyisobutylene. There may be an external anode contact 603.

Polyisobutylene (PIB) may be a commercially-available material that may be formulated into PSA compositions meeting many if not all requirements. Furthermore, PIB may be an excellent barrier sealant with very low water absorbance and low oxygen permeability. An example of PIB useful in the examples of the present invention may be Oppanol® B 15 by BASF Corporation.

Next, FIG. 6B illustrates an exemplary bottom-up view of the battery element without encapsulation. Hereto, the periphery 601 of the device may be cut out from its surrounding layers and allow for encapsulation of the device in subsequent steps. In some examples, seals may be formed by a welding process that may involve thermal, laser, solvent, friction, ultrasonic, or arc processing. In other examples, seals may be formed through the use of adhesive sealants such as glues, epoxies, acrylics, natural rubber, and synthetic rubber. Other examples may derive from the utilization of gasket type material that may be formed from cork, natural and synthetic rubber, polytetrafluoroethylene (PTFE), polypropylene, and silicones to mention a few non-limiting examples. From beneath, a cathode current collector 604 with cathode is also visible. There may be an external cathode contact 605.

FIG. 6C illustrates an exemplary long-edge cross sectional view of a polymer battery without encapsulation containing an anode current collector 602 where the anode current collector is the anode as well, a cathode current collector 604 with cathode 612, and a polymer electrolyte 610 which also functions as a separator, and adhesive/sealant 608 to seal the laminate pieces 609 to the associated collector layers and to each other.

During later processing, the periphery 601 of the device may be enveloped with sealing layers. The layers may enclose the components of the biocompatible energization element from the top and the bottom; the anode and cathode collector contacts are not sealed at the ends so that external contact may be made.

Referring to FIGS. 7A-7J processing of a polymer electrolyte based battery is depicted. FIG. 7A shows a cathode contact 710 with a carbon coating 715. In examples where the carbon coating may coat both sides of the cathode contact, a portion may be shielded or removed to expose a contact connection. The processing may continue to FIG. 7B, a laminate layer 720 with a release layer 721 may have a preformed cavity 722. The laminate layer 720 may be adhered to the cathode contact 710 upon the carbon coating 715. Referring to FIG. 7C, a cathode slurry, as discussed in reference to FIG. 4B, may be used to fill the cavity 722 with the cathode 730. At FIG. 7D the release layer may be removed, and the cathode layer may be dried by the various means as have been previously discussed. This forms the cathode pieces that may be joined to anode and electrolyte pieces. Exemplary processing steps to form the anode and electrolyte pieces follow in the next steps.

Referring to FIG. 7E, an anode contact 750, which may be a zinc film as discussed in previous sections, or may be an anode film of various types may have a second laminate film 751 with a second cavity 753 placed thereon. The second cavity 753 may align with the first cavity 722 when the two pieces are ultimately brought together. The laminate piece may have a release layer 752. Referring next to FIG. 7F the second cavity may be filled with a polymer electrolyte formulation as described previously in this description to form the polymer electrolyte 760.

Referring to FIG. 7G, the release layer 752 may be removed and the polymer electrolyte may be dried by various means. The two pieces, the laminate filled cathode and the laminate filed polymer electrolyte may be brought together as depicted in FIG. 7H. A vacuum laminator 770 may heat the two pieces and press them together to form the laminated piece as depicted at FIG. 7I. The laminate structure may have numerous alignment marks printed into the laminate body that may be used for alignment of the various processing and may align target regions around the battery body to be cut out by punching or laser cutting or by other means. The cutting may be used to cut out material around the battery. In FIG. 7J, a top down view is shown with a battery body 780 that has had material from the laminate structure cut or punched out to form the gap 781. A subsequent sealing process with a foil above and below the battery layer may now create a seal fully around the battery body. In some examples, the sealing foils above and below the battery body may have holes in them that align to desired contact points on the current collectors. In the depicted example, tabs 782 to hold the battery bodies may be left connected to the battery. The sealant layers may not cover an end region of the batteries when these tabs 782 are subsequently cut to singulate the battery elements. In some examples, the singulation means including laser cutting or heated die punching may create a seal in these layers as it cuts. In the examples, a linear battery body is depicted, but curvilinear shapes may be processed in a similar manner using the steps as have been depicted.

Well-designed sealing structures and the associated sealing materials may improve biocompatibility of the energization device as materials may be maintained in zones that have no interaction with biologically contacting surfaces. In addition, well-formed seals may improve the ability of the battery to receive forces of various kinds and not rupture exposing the contents of the cavity or cavities of a battery.

The polymer electrolyte composition inherently improves biocompatibility of the energization element as well as its resiliency to effect from external diffusion into the battery. The solid-state aspect of the polymer backbone and its containment of ions whether in solvent or not minimizes forces that may cause loss of electrolyte by diffusion out of the device.

The examples herein have discussed polymer electrolyte primary battery devices which have been formed according to the various manners described in the present invention. At a higher level, in some examples, these battery devices may be incorporated into biomedical devices such as ophthalmic lenses as discussed in reference to FIG. 1B.

In the examples of contact lenses, the battery device may be connected to an electroactive element where the battery resides within an insert with the electroactive element or outside the insert. The insert, the electroactive element and the battery as a whole may be encapsulated with appropriate hydrogel formulations to afford biocompatibility of the biomedical device. In some examples, the hydrogel may contain formulations that retain the wetting aspects of the encapsulating hydrogel. Thus, numerous aspects of biocompatibility related to the shell that contains components are relevant to the biocompatibility of the biomedical device as a whole. These aspects may include oxygen permeability, wettability, chemical compatibility, and solute permeability as a few non-limiting examples.

The battery and the insert may interact with wet environments, and therefore the strategies for biocompatibility of the battery alone are very relevant to the overall biomedical device. In some examples it may be envisioned that seals prevent ingress and egress of materials into the insert and into the battery device. In these examples, the design of the hydrogel encapsulating layer may be altered to allow wettability and permeability around the insert and the battery device, for example. In some other examples, gas evolution may allow some gas species to pass through battery devices, through hydrogel encapsulation and into the biomedical device environment. The portions of a biomedical device, whether for an ophthalmic device or for other devices, that contact fluids and cell layers of a user may be designed for matching of the interface layers of the biomedical device to the biologic environment that the biomedical device will reside in or on.

External Encapsulating Layers of Electroactive Devices and Batteries

In some examples, a preferred encapsulating material that may form an encapsulating layer in a biomedical device may include a silicone containing component. In an example, this encapsulating layer may form a lens skirt of a contact lens. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some examples, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

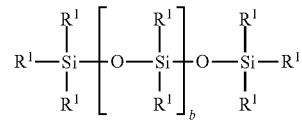

where

R1 is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one R1 comprises a monovalent reactive group, and in some examples between one and 3 R1 comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, C1-6alkyl(meth)acrylates, (meth)acrylamides, C1-6alkyl (meth)acrylamides, N-vinyllactams, N-vinylamides, C2-5alkenyls, C2-5 alkenylphenyls, C2-5 alkenylnaphthyls, C2-6alkenylphenylC1-6alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent C1 to C16alkyl groups, C6-C14 aryl groups, such as substituted and unsubstituted methyl, ethyl, propyl, butyl, 2-hydroxypropyl, propoxypropyl, polyethyleneoxypropyl, combinations thereof and the like.

In one example, b is zero, one R1 is a monovalent reactive group, and at least 3 R1 are selected from monovalent alkyl groups having one to 16 carbon atoms, and in another example from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris (trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal R1 comprises a monovalent reactive group and the remaining R1 are selected from monovalent alkyl groups having 1 to 16 carbon atoms, and in another embodiment from monovalent alkyl groups having 1 to 6 carbon atoms. In yet another embodiment, b is 3 to 15, one terminal R1 comprises a monovalent reactive group, the other terminal R1 comprises a monovalent alkyl group having 1 to 6 carbon atoms and the remaining R1 comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal R1 comprise monovalent reactive groups and the remaining R1 are independently selected from monovalent alkyl groups having 1 to 18 carbon atoms, which may have ether linkages between carbon atoms and may further comprise halogen.

In one example, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four R1 comprises a vinyl carbonate or carbamate of the formula:

$$H_2C=\overset{R}{\underset{|}{C}}-(CH_2)_q-O-\overset{O}{\underset{\|}{C}}-Y \qquad \text{Formula II}$$

wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and $$H_2C=\overset{O}{\underset{\|}{\underset{H}{C}}}-OCO(CH_3)_4-\underset{\underset{CH_3}{|}}{\overset{\overset{CH_3}{|}}{Si}}-O\left[\underset{\underset{CH_3}{|}}{\overset{\overset{CH_3}{|}}{Si}}-O\right]_{25}\underset{\underset{CH_3}{|}}{\overset{\overset{CH_3}{|}}{Si}}-(CH_2)_4OCO-\overset{O}{\underset{\underset{H}{\|}}{C}}=CH_2$$

Where biomedical devices with modulus below about 200 are desired, only one R1 shall comprise a monovalent reactive group and no more than two of the remaining R1 groups will comprise monovalent siloxane groups.

Another class of silicone-containing components includes polyurethane macromers of the following formulae:

(*D*A*D*G)a*D*D*E1;

E(*D*G*D*A)a*D*G*D*E1 or;

E(*D*A*D*G)a*D*A*D*E1     Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of formula:

$$-(CH_2)_y-\left[\underset{\underset{R^{11}}{|}}{\overset{\overset{R^{11}}{|}}{SiO}}\right]_p\underset{\underset{R^{11}}{|}}{\overset{\overset{R^{11}}{|}}{Si}}-(CH_2)_y- \qquad \text{Formula VII}$$

R11 independently denotes an alkyl or fluoro-substituted alkyl group having 1 to 10 carbon atoms, which may contain ether linkages between carbon atoms; y is at least 1; and p provides a moiety weight of 400 to 10,000; each of E and E1 independently denotes a polymerizable unsaturated organic radical represented by formula:

$$R^{13}CH=\overset{R^{12}}{\underset{|}{C}}-(CH_2)_w-(X)_x-(Z)_z-(Ar)_y-R^{14}- \qquad \text{Formula VIII}$$

wherein: R5 is hydrogen or methyl; R13 is hydrogen, an alkyl radical having 1 to 6 carbon atoms, or a —CO—Y—R15 radical wherein Y is —O—, Y—S— or —NH—; R14 is a divalent radical having 1 to 5 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

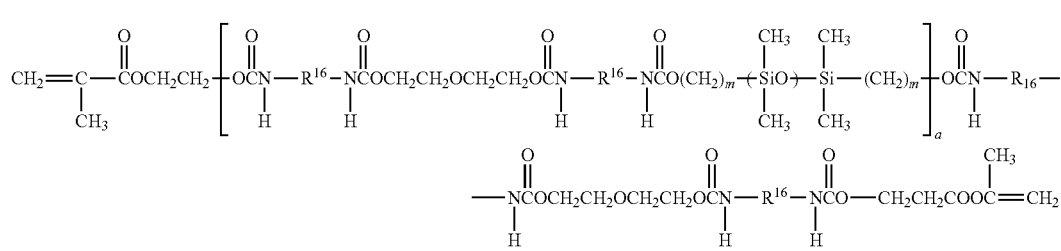

Formula IX wherein R16 is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

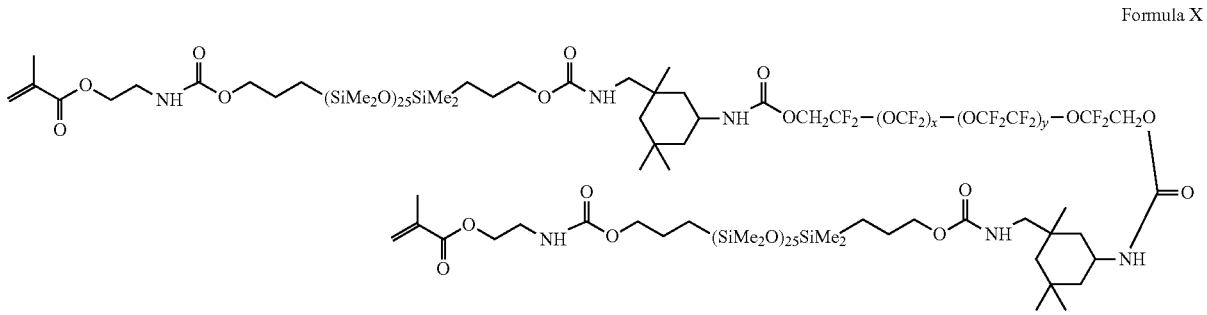

Formula X

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. In some examples, the polymer backbone may have zwitterions incorporated into it. These zwitterions may exhibit charges of both polarity along the polymer chain when the material is in the presence of a solvent. The presence of the zwitterions may improve wettability of the polymerized material. In some examples, any of the foregoing polysiloxanes may also be used as an encapsulating layer in the present invention.

Biomedical Devices Using Batteries with Polymer Electrolytes

The biocompatible batteries may be used in biocompatible devices such as, for example, implantable electronic devices, such as pacemakers and micro-energy harvesters, electronic pills for monitoring and/or testing a biological function, surgical devices with active components, ophthalmic devices, microsized pumps, defibrillators, stents, and the like.

Specific examples have been described to illustrate sample embodiments for the cathode mixture for use in biocompatible batteries. These examples are for said illustration and are not intended to limit the scope of the claims in any manner. Accordingly, the description is intended to embrace all examples that may be apparent to those skilled in the art.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A biomedical device comprising:
  an electroactive component;
  a curvilinear shaped biocompatible battery, wherein the curvilinear shape is a portion of an annulus and components of the battery are shaped to accommodate the curvilinear shape, wherein the battery includes:
    an anode current collector;
    a cathode current collector;
    an anode;
    a polymer electrolyte comprising poly(vinylidene) fluoride in a gel form, wherein the polymer electrolyte gel improves the biocompatibility of the battery, wherein the polymer electrolyte gel does not contain a component available to leak out of the biocompatible battery, and wherein the polymer electrolyte comprises an ionic species of zinc;
    manganese dioxide cathode;
    a first laminate layer comprising a first cavity, wherein the first cavity contains an amount of the polymer electrolyte; and
    a second laminate layer comprising a second cavity, wherein the second cavity contains an amount of the manganese dioxide cathode; and
  a first biocompatible encapsulating layer, wherein the first biocompatible encapsulating layer encapsulates at least the electroactive component and the battery, and wherein the biocompatible encapsulating layer comprises a silicone hydrogel.

2. The biomedical device of claim 1,
wherein the anode comprises zinc; and
wherein the anode and the anode current collector are a single layer.

3. The biomedical device of claim 1, wherein the composition of the manganese dioxide cathode comprises jet milled electrolytic manganese dioxide.

4. The biomedical device of claim 3, wherein the composition of the manganese dioxide cathode comprises poly (vinylidine fluoride).

5. The biomedical device of claim 4, wherein the composition of the manganese dioxide cathode comprises carbon black.

6. The biomedical device of claim 5, wherein the zinc anode is a foil of zinc.

7. The biomedical device of claim 1, wherein the battery comprises a seal in encapsulating films that enclose more than 90 percent of the battery portions not used for making external contacts.

8. The biomedical device of claim 1, wherein the thickness of the battery is less than 1 mm at least along a first dimension of the extents of the battery.

9. The biomedical device of claim 1, wherein the thickness of the battery is less than 500 microns at least along a first dimension of the extents of the battery.

10. The biomedical device of claim 1, wherein the thickness of the battery is less than 250 microns at least along a first dimension of the extents of the battery.

* * * * *